US011150962B2

United States Patent
Niles et al.

(10) Patent No.: US 11,150,962 B2
(45) Date of Patent: Oct. 19, 2021

(54) APPLYING AN ALLOCATION POLICY TO CAPTURE MEMORY CALLS USING A MEMORY ALLOCATION CAPTURE LIBRARY

(71) Applicant: MemVerge, Inc., Milpitas, CA (US)

(72) Inventors: Ronald S. Niles, San Jose, CA (US); Yue Li, Fremont, CA (US)

(73) Assignee: MemVerge, Inc., Milpitas, CA (US)

( * ) Notice: Subject to any disclaimer, the term of this patent is extended or adjusted under 35 U.S.C. 154(b) by 61 days.

(21) Appl. No.: 16/698,012

(22) Filed: Nov. 27, 2019

(65) Prior Publication Data

US 2021/0019200 A1 Jan. 21, 2021

Related U.S. Application Data

(60) Provisional application No. 62/875,426, filed on Jul. 17, 2019.

(51) Int. Cl.
*G06F 9/54* (2006.01)
*G06F 9/50* (2006.01)
(Continued)

(52) U.S. Cl.
CPC .............. *G06F 9/54* (2013.01); *G06F 9/4868* (2013.01); *G06F 9/5016* (2013.01); *G06F 11/073* (2013.01); *G06F 12/0238* (2013.01); *G06F 12/1009* (2013.01); *G06F 9/4881* (2013.01); *G06F 11/0766* (2013.01); *G06F 12/023* (2013.01); *G06F 12/08* (2013.01);
(Continued)

(58) Field of Classification Search
None
See application file for complete search history.

(56) References Cited

U.S. PATENT DOCUMENTS

| 6,366,994 | B1 * | 4/2002 | Kalyur | G06F 9/5016 |
| | | | | 711/129 |
| 2002/0055980 | A1 * | 5/2002 | Goddard | H04L 69/16 |
| | | | | 709/217 |

(Continued)

OTHER PUBLICATIONS

Condit et al. "Better I/O Through Byte-Addressable, Persistent Memory" (Copyright 2009) (Year: 2009).*

(Continued)

*Primary Examiner* — Michael W Ayers
(74) *Attorney, Agent, or Firm* — Perkins Coie LLP

(57) ABSTRACT

A technique is introduced for intercepting memory calls from a user-space application and applying an allocation policy to determine whether such calls are handled using volatile memory such as dynamic random-access memory (DRAM) or persistent memory (PMEM). In an example embodiment, memory calls from an application are intercepted by a memory allocation capture library. Such calls may be to a memory function such as malloc( ) and may be configured to cause a portion of DRAM to be allocated to the application to process a task. The memory allocation capture library then determines whether the intercepted call satisfies capture criteria associated with an allocation policy. If the intercepted call does satisfy the capture criteria, the call is processed to cause a portion of PMEM to be allocated to the application instead of DRAM.

28 Claims, 19 Drawing Sheets

(51) Int. Cl.
  *G06F 9/48* (2006.01)
  *G06F 11/07* (2006.01)
  *G06F 12/02* (2006.01)
  *G06F 12/1009* (2016.01)
  *G06F 12/14* (2006.01)
  *G06F 12/08* (2016.01)
(52) U.S. Cl.
  CPC .... *G06F 12/1491* (2013.01); *G06F 2209/542* (2013.01); *G06F 2212/1016* (2013.01)

(56) References Cited

U.S. PATENT DOCUMENTS

| | | | | |
|---|---|---|---|---|
| 2008/0282022 | A1* | 11/2008 | Gonikberg | G06F 12/0638 711/102 |
| 2010/0161929 | A1* | 6/2010 | Nation | G06F 9/5016 711/170 |
| 2012/0137055 | A1* | 5/2012 | Lee | G06F 12/0223 711/103 |
| 2012/0246392 | A1* | 9/2012 | Cheon | G06F 12/0638 711/103 |
| 2014/0101370 | A1* | 4/2014 | Chu | G06F 12/0238 711/103 |
| 2015/0149715 | A1* | 5/2015 | Davis | G06F 12/0238 711/105 |
| 2015/0324131 | A1* | 11/2015 | Loh | G06F 3/0631 711/117 |
| 2016/0170645 | A1* | 6/2016 | Kumar | G06F 12/0842 711/170 |
| 2018/0157585 | A1* | 6/2018 | Barrus | G06F 12/0223 |
| 2019/0108116 | A1* | 4/2019 | Benes | G06F 9/45558 |
| 2020/0218583 | A1* | 7/2020 | Borkar | G06F 21/629 |

OTHER PUBLICATIONS

Oikawa et al. "File-based Memory Management for Non-Volatile Main Memory" (Copyright 2013) (Year: 2013).*

* cited by examiner

APPLYING AN ALLOCATION POLICY TO CAPTURE MEMORY CALLS USING A MEMORY ALLOCATION CAPTURE LIBRARY

CROSS-REFERENCE TO RELATED APPLICATION(S)

This application claims the benefit of U.S. Provisional Application No. 62/875,426 titled, "VOLATILE MEMORY MODE INNOVATIONS," filed Jul. 17, 2019, the contents of which are hereby incorporated by reference in their entirety for all purposes. This application is therefore entitled to a priority date of Jul. 17, 2019.

TECHNICAL FIELD

The present disclosure relates generally to memory management in a computer system, and more particularly, to the processing of memory calls from an application.

BACKGROUND

The computer industry continues to develop and refine solid-state storage devices and media, moving closer and closer to achieving memory-class storage. In the past several years the access latency of affordable storage devices has dramatically decreased and is expected to continue to decrease in coming years. At the same time, advances in networking technology have led to increases in bandwidth with commensurate decreases in latency. Further, the emergence of standardized remote direct memory access (RDMA) functionality has led to improvements in communication efficiency and further reduced latency.

These faster computing infrastructures demand new data infrastructures where both memory-speed data access and disk-like high storage density are strongly desired at the same time. Such new data infrastructures promise to bring significant performance improvements to computing tasks whose working data sets exceed dynamic random-access memory (DRAM) capacity, and where highly frequent data movements between DRAM and lower storage tiers, such as solid-state drive (SSD) and hard disk drive (HDD), are therefore required.

To provide the lowest possible access latency, operating system support of emerging persistent memory (PMEM) technology has created mechanisms for a user-space application to have direct access (DAX) to persistent memory media (i.e., without the access being performed by operating system software). PMEM generally refers to solid-state byte addressable memory devices that reside on a memory bus of a given system. Being on the memory bus allows PMEM to have similar speed and latency as DRAM as well as the non-volatility of SSDs and HDDs. Examples of existing solutions from providing DAX to PMEM include "NOVA," "Strata," "Octopus," "Hotpot," and "FluidMem."

DETAILED DESCRIPTION

Overview

Figure 1:
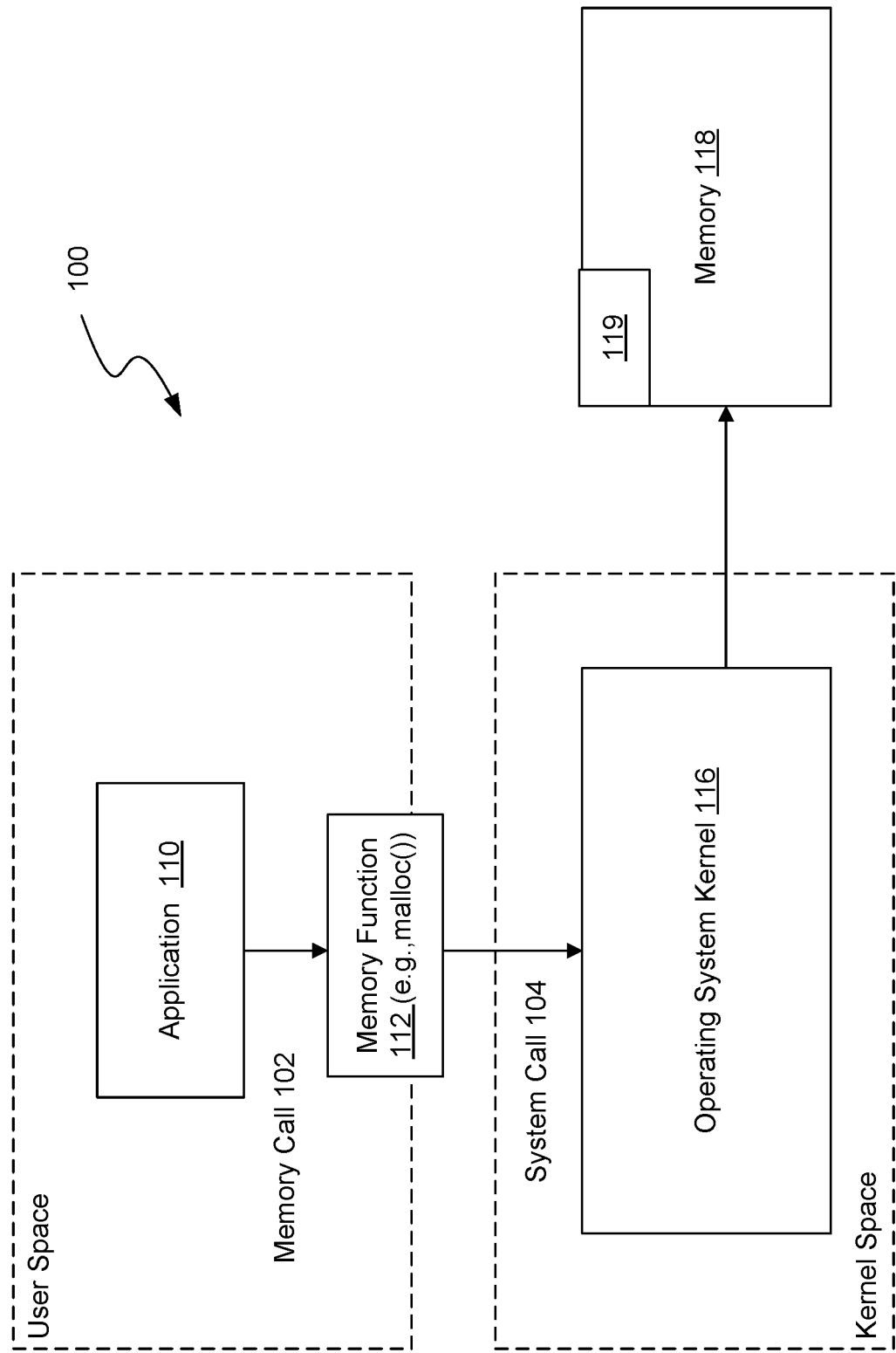
FIG. 1 shows diagram illustrating a typical process for allocating memory to an application in a computer system.

Computer systems typically provide mechanisms to allocate volatile memory to user-space applications. For example, to obtain an allocation in volatile memory to facilitate execution, an application may submit, transmit, generate, or otherwise communicate a memory allocation request. Depending on the architecture of the computing system, this memory allocation request may be communicated in the form of a system call to a core of the computer system's operating system (i.e., the kernel) and/or through the use of a higher-level library function. Volatile memory can include, for example, DRAM, synchronous DRAM (SDRAM), and/or static random-access memory (SRAM). For illustrative simplicity, certain embodiments of the introduced technique are described herein with respect to DRAM; however, a person having ordinary skill will recognize that the introduced technique can be applied to systems that have other types of volatile memory including SDRAM, SRAM, etc.

In some embodiments, a computer system can be configured to provide user-space applications with direct access to DRAM and/or PMEM. In some embodiments, PMEM can be implemented in a distributed manner through the use of a distributed memory object (DMO) system that provides a cluster of DMOs implemented across multiple physical devices. Although PMEM is persistent by nature, there are situations in which persistence is not necessary and PMEM can instead be used in a volatile mode to, for example, provide byte-addressable memory to an application when memory requirements exceed available volatile memory such as DRAM. Using PMEM in volatile mode may present a better performance alternative to memory that would otherwise be swapped using virtual memory. Examples where use of PMEM in volatile mode may be advantageous include computations on large social media graphs and various machine learning application.

Using direct access to PMEM in volatile mode presents several challenges. For example, in many cases it is not feasible to modify an application to make use of volatile mode PMEM. Similarly, reconfiguring a computer system at the kernel level to offload certain memory requests to PMEM can introduce various security issues. Further, while byte-addressable like DRAM, PMEM is typically not as fast as DRAM and may not be suitable for replacement of all the memory buffers requested by a memory application programming interface (API) such as malloc( ) since that may cause the application to execute at a slower rate. Also, when an application forks a child operation while one of its private mappings has been mapped to a DAX PMEM device, the copy-on-write functionality that would normally accompany that buffer is not provided. As a result, changes made to a mapped buffer in the child operation would incorrectly be visible in the parent operation, and vice versa.

Introduced herein is a technique for implementing PMEM in volatile mode that addresses the above-mentioned challenges. In an example embodiment, a memory allocation capture library is implemented to intercept memory calls from an application and whether such calls are to be handled using volatile memory such as DRAM or whether such calls are to be handled using volatile mode local and/or remote PMEM, for example, that is part of a DMO. The memory allocation capture library can apply an allocation policy to intercepted calls to determine whether to capture and process such calls. In some embodiments, the memory allocation capture library can be configured to use a multi-level caching mechanism to deploy volatile memory (e.g., DRAM), local PMEM, and remote PMEM, for example, in accordance with resource availability and real-time (or near-real-time) monitoring of page accesses by an application. In some embodiments, the memory allocation capture library can be configured to handle application forks by, for example, cloning (pre-fork or post-fork) a separate copy of PMEM for a child operation based on monitored PMEM utilization by a parent operation.

Allocating Memory to an Application—Existing Technique

FIG. 1 shows diagram illustrating a typical process 100 for allocating memory to an application in a computer system. As shown in FIG. 1, an application 110 executing a user-space task may submit, transmit, generate, communicate, invoke, or otherwise make a memory call 102 to a memory function 112 configured to submit, transmit, generate, communicate, invoke, or otherwise make a system call 104 (e.g., sbrk) to an operating system kernel 116 to allocate and/or manage an allocated portion 119 of memory 118.

The memory function 112 may include one or more functions for performing memory management (e.g., memory allocation, reallocation, release, etc.). In some embodiments, the memory function 112 includes one or more functions in a software library of a standardized programming language (e.g., C, C++, etc.). For example, the C standard library includes C dynamic memory allocation functions such as malloc( ) which allocates a specified number of bytes, realloc( ) which increases or decreases the size of a specified block of memory, calloc( ) which allocates a specified number of bytes and initializes them to zero and free( ) which releases a specified block of memory back to the system. These are just examples of memory functions and are not to be construed as limiting. Other memory functions include mmap( ), mmap64( ), munmap( ), mprotect( ), madvise( ), etc.

In an illustrative embodiment, a user process executing in the application 110 calls a memory function 112 (e.g., malloc( )). This memory allocation function 112 then invokes an appropriate kernel service using a system call 104 to allocate the appropriate portion 119 of memory 118. In other words, there is a separation of duties between the user-space application 110 and the lower-level operating system kernel 116. The system call 104 causes the operating system kernel 116 to allocate memory on behalf of the user-space application 110.

Applying an Allocation Policy to Capture Memory Calls

As previously mentioned, PMEM is typically not as fast as DRAM and may not be suitable for replacement of all the memory buffers requested by a memory application programming interface (API) such as malloc( ) since that may cause the application to execute at a slower rate. In other words, situations can arise in which certain memory requests can be handled using PMEM while other memory requests should instead be handled using volatile memory such as DRAM.

For example, many machine learning applications based on TensorFlow use 256 KB buffers for preprocessing of data and 2 MB buffers for the computation. Replacing the 2 MB buffers with PMEM can have a large negative impact on performance, while replacing the 256K buffers with PMEM has little negative impact on performance. In such a case, it may be preferable to handle the 2 MB buffer using DRAM while offloading the 256 k buffer to be handled using PMEM to free up the limited DRAM capacity for other tasks.

One possible approach to address this issue includes modifying an application to allocate memory through a custom API such that certain memory requests are handled using PMEM and others are handled using DRAM. While such an approach may be effective in certain cases, many modern applications are too complicated to allocate memory though a custom API. For example, it is likely that many such applications are calling APIs such as malloc( ) and/or mmap( ) through a dynamically loaded memory function library to access available DRAM in a computer system.

Another possible approach to address this issue includes providing the application with access to the operating system kernel to manage memory allocations. As with modifying the application to allocate memory through a custom API, this approach also introduces the complication of having to modify the application to manage memory allocations in DRAM and PMEM and further introduces security concerns. The kernel space has access to everything in a computer system. It is difficult to sell applications that go into the kernel because any adopter (especially an enterprise, government, or other type of organization) of the application will have to vet the application to make sure the application will not take over their systems in a hostile manner.

To address these challenges, a technique can be implemented to intercept memory calls from a user-space application and apply an allocation policy to determine whether such calls are handled in DRAM or in PMEM. In an example embodiment, memory calls from an application are intercepted by a memory allocation capture library. Such calls may be to a memory function such as malloc( ) or mmap( ) and may be configured to cause a portion of volatile memory (e.g., DRAM) to be allocated to the application to process a task. The memory allocation capture library will determine whether the intercepted call satisfies one or more capture criteria associated with an allocation policy. If the intercepted call does satisfy the one or more capture criteria, the memory allocation capture library processes the call to cause a portion of PMEM to be allocated to the application instead of DRAM. In some embodiments, the allocated portion of PMEM is or is part of a DMO.

Figure 2:
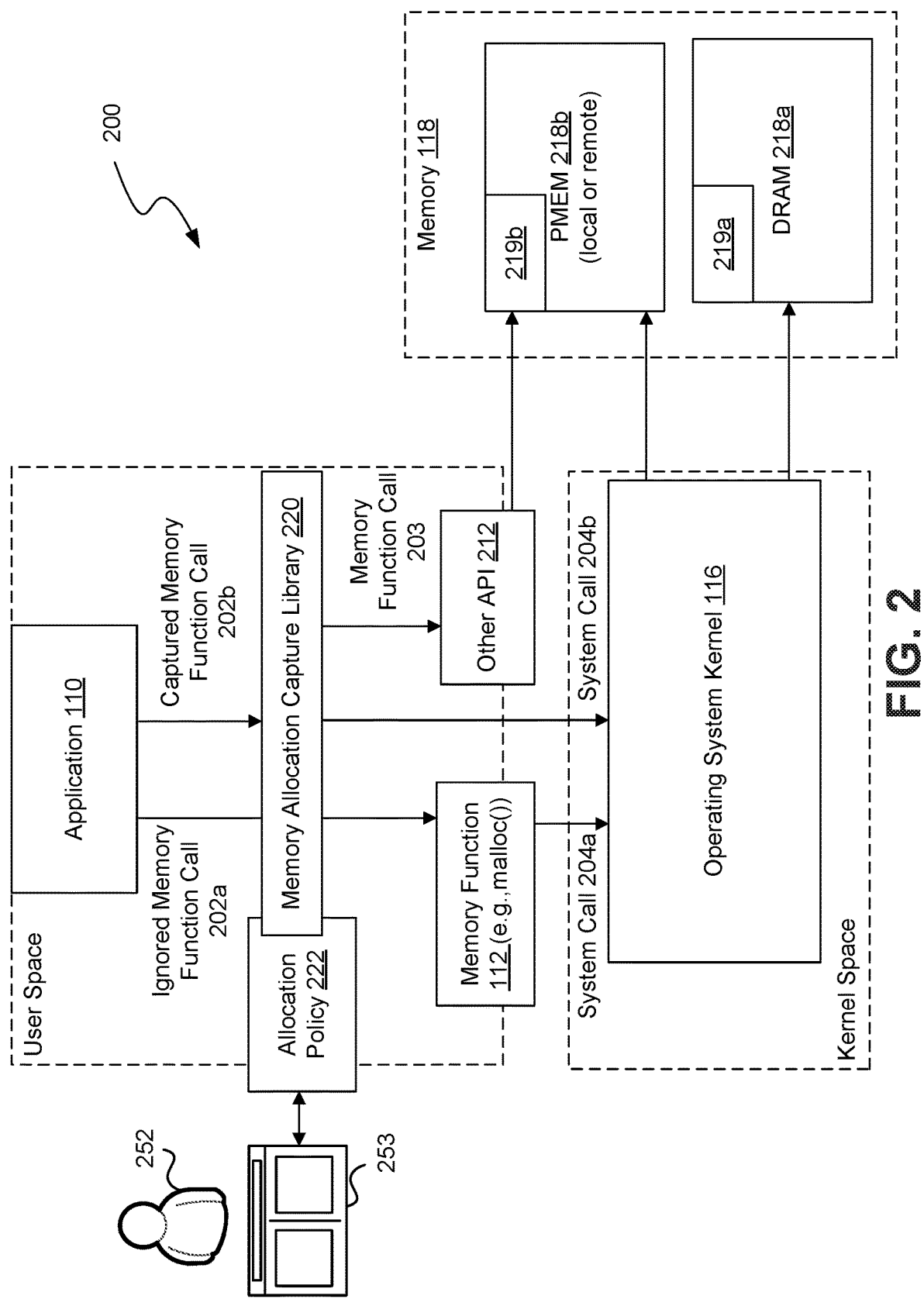
FIG. 2 shows an architecture flow diagram illustrating an example process for applying an allocation policy to capture memory calls from an application, according to an embodiment of the introduced technique.

FIG. 2 shows a diagram illustrating an example process 200 for applying an allocation policy to capture memory calls, according to an embodiment of the introduced technique. As shown in FIG. 2, an application 110 executing a user-space task may submit, transmit, generate, communicate, or otherwise invoke calls to a memory function 112, for example, as described with respect to FIG. 1. In other words, the application 110 shown in FIG. 2 can be the same as the application 110 shown in FIG. 1 and does not need to be specifically configured for implementation according to the introduced technique.

The introduced technique includes implementation of a memory allocation capture library 220 configured to capture calls by application 110 to one or more APIs such as memory function 112. For example, the memory allocation capture library 220 can be configured to intercept calls by the application 110 to a memory function such as malloc( ), calloc( ), realloc( ), mmap( ), mmap64( ), munmap( ), mprotect( ), madvise( ), etc. A "call" refers to any type of communication between entities such as the application 110 and memory function 112. For example, a memory call may include a digital message that includes data (e.g., a set of parameter values) configured to cause another entity (i.e., the memory function 112) to perform certain operations such as making a subsequent system call to cause a portion of memory 118 to be allocated to the application 110. "Intercepting" a call refers to the act of receiving, retrieving, or otherwise obtaining a call from the application 110 that was intended for another destination (e.g., memory function 112).

In some embodiments, the memory allocation capture library 220 described herein may represent one or more software components. For example, the memory allocation capture library 220 may group together multiple compiled object code files in a single file that can be linked by multiple applications. In some embodiments, the memory allocation capture library 220 may be implemented as a static library (e.g., as a ".a" file) that is linked with and effectively part of the application 110. Alternatively, in other embodiments, the memory allocation capture library 220 may be implemented as a dynamically linked (or "shared object") library (e.g., as a ".so" file) that can be dynamically linked to the application 110 during execution. For illustrative simplicity, certain processes, operations, steps, and/or functions are described herein as being performed by the memory allocation capture library 220; however, a person having ordinary skill in the art will recognize that, in some embodiments, such processes, operations, steps, and/or functions may actually be performed by an executable program that uses the memory allocation capture library 220.

When the application 110 makes a memory call, the memory allocation capture library 220 can intercept the call and determine whether to ignore the call or to capture the call. For example, FIG. 2 depicts a scenario in which the application 110 has made two memory calls 202a and 202b. In this example, both memory calls 202a and 202b are calls to a memory function 112 such as malloc( ). Here, a first memory call 202a is intercepted by the memory allocation capture library 220 and ignored. In other words, the first memory call 202a continues to the appropriate memory function 112 which may in turn make a system call 204a to the kernel 116 to allocate a portion of memory 118. Depending on the configuration of the computer system, an ignored memory call 202a made through this standard path will typically be handled using DRAM. For example, an ignored memory allocation call 202a (e.g., a call to malloc( )) may cause an allocation of a memory chunk in DRAM 218a (e.g., memory chunk 219a).

As alluded to previously, certain memory calls can be handled using PMEM instead of DRAM. If the memory allocation capture library 220 determines that an intercepted call should be handled using PMEM instead of DRAM, the memory allocation capture library 220 can capture the call and handle the call in a customized manner to take advantage of what is likely the much larger byte-addressable space of PMEM. For example, as shown in FIG. 2, a second memory call 202b is captured by the memory allocation capture library 220. Again, the captured memory call 202b may be a call to a memory function 112, for example, similar to memory call 220a. In other words, from the point of view of the application 110, memory call 202b may be no different than memory call 202a. The application 110 has no knowledge of the memory allocation capture library 220 and is not specifically making a call to the memory allocation capture library 220.

Memory calls that are captured by the memory allocation capture library 220 are handled in a customized manner to allocate or otherwise manage a portion of memory 118. For example, in some embodiments, response to capturing a memory call, the memory allocation capture library 220 may submit, transmit, generate, communicate, or otherwise invoke a system call 204b to the operating system kernel 116 to handle the request using an alternative to DRAM such as PMEM 218b. In other words, the system call 204b may cause the allocation of a portion of PMEM 218b (e.g., memory chunk 219b). In other embodiments, in response to capturing a memory call, the memory allocation capture library 220 may submit, transmit, generate, communicate, or otherwise invoke a call 203 to another API 212 to handle using an alternative to DRAM such as local or remote PMEM 218b. The other API 212 may rely on RDMA or other mechanisms to allocate the portion of PMEM 218b without involving the operating system kernel 116. For example, as will be described in more detail, in some embodiments, a computer system may be configured to enable applications with direct access to DMOs. Such DMOs may include local and/or remote PMEM 218b. In such an example, the memory allocation capture library 220 can process a captured memory call 202b by submitting, transmitting, generating, communicating, or otherwise invoking a call to an API 212 associated with a DMO system to allocate a DMO that is accessible to the application 110.

The memory allocation capture library 220 can apply one or more allocation policies 222 to determine whether to capture (i.e., process) an intercepted memory call from application 110 or to ignore such a call. The allocation policy 222 may specify various capture criteria that, when satisfied, cause the memory allocation capture library 220 to capture an intercepted memory call. Accordingly, the process of applying the one or more allocation policies 222 may include intercepting a memory call, processing the memory call to identifying parameters of the memory call, and determining if the parameters of the memory call satisfy one or more capture criteria specified by the one or more allocation policies 222.

Parameters of an intercepted memory call may include, for example, the type of memory call (e.g., malloc( ), mmap ( ), etc.), a size of a mapping associated with the memory call (e.g., 256 KB vs. 2 MB, etc.), certain flags in mappings associated with the memory call (e.g., MAP_STACK, MAP_ NORESERVE, etc.), the application where the memory call originated, the type of the application where the memory call originated (e.g., a machine learning application vs. other types of applications), etc. In some embodiments, the parameters of an intercepted memory call may further include timing information associated with the call such as a time of day when the call was intercepted, a period of time elapsed since the call was intercepted, etc. These are just examples of certain parameters of an intercepted memory call that can be considered and are not intended to be limiting. Other types of parameters can similarly be considered when determining whether to capture an intercepted memory call from an application.

In some embodiments, the allocation policy 222 may be hard coded into the memory allocation capture library 220. Alternatively, in other embodiments, the allocation policy 222 may be generated, updated, stored, managed, etc. independent of the memory allocation capture library 220. For example, the allocation policy 222 may be stored in a database that is accessible to the memory allocation capture library 220. Further, the allocation policy 222 may be independently updated (manually and/or automatically) without updating the memory allocation capture library 220.

In some embodiments, the one or more allocation policies 222 applied by the memory allocation capture library 220 can be modified by a user by adjusting one or more configurable parameters associated with the capture criteria. For example, a user may specify whether to capture malloc( ) calls, mmap( ) calls, or both. The user can also specify a minimum, maximum, and/or range of mapping sizes to capture. The user can also specify whether to capture or ignore mappings with certain flags. The user can also specify a particular period of time (e.g., a number of seconds) to wait after intercepting a memory call before capturing the call (assuming other capture criteria are satisfied). Again, these are just examples of certain parameters that a user can configure to control which memory calls are captured by the memory allocation capture library 220 and which calls are ignored.

As shown in FIG. 2, a user 252 may adjust capture criteria of the allocation policy 222, for example, by providing inputs via user interface 253 that set certain parameter values. The user 252 in this context may be an end user of the application 110, an administrator user (e.g., of a DMO system), etc. The user interface 253 may include a GUI configured to receive user inputs and present visual outputs. The user interface 253 may be accessible via a web browser, desktop application, mobile application, or over-the-top (OTT) application, or any other type of application at the user computing device. The user computing device displaying user interface 253 may include, for example, a desktop computer, a laptop computer, a server computer, a smartphone, a tablet computer, a wearable device, or computing device capable of presenting user interface 253, and/or communicating over a computer network.

In an example embodiment, a computer system receives an input from a user 252, for example, via interface 253. The input includes a user selection of various parameters such as a type of call (e.g., malloc( ), mmap( ), etc.), a size of a mapping associated with the memory call (e.g., 256 KB vs. 2 MB, etc.), certain flags in mappings associated with the memory call (e.g., MAP_STACK, MAP_NORESERVE, etc.), the application where the memory call originated (e.g., a specific application identifier), the type of the application where the memory call originated (e.g., a machine learning application vs. other types of applications), timing information (e.g., a time of day, time delay, etc.) or any other type of parameter. For example, using interface 253, a user 252 may select the type of call to include malloc( ) and a maximum mapping size of 256 KB. The computer system can process the parameters included in the user's input to generate an updated capture criterion. The updated capture criterion in this example would specify that all calls to malloc( ) for mappings that are 256 KB or less are to be captured. The allocation policy 222 can then be configured based on the updated capture criterion, for example, by replacing previous capture criteria and/or supplementing previous capture criteria.

In some embodiments, the allocation policy 222 can be automatically updated using machine learning techniques. For example, various performance metrics (e.g., processing time, DRAM utilization, etc.) associated with previous application of the introduced technique can be tracked and used as feedback data that is used to train a machine learning model to determine updated capture criteria for an allocation policy 222. The capture criteria associated with an allocation policy 222 may therefore continually update as the system learns which calls can be captured and handled using PMEM without significantly impacting the performance of applications.

In an example embodiment, a computer system may track the performance of processing one or more application tasks. Application tasks may include previous tasks by application 110 and/or tasks by other applications executed by the computer system. For example, a computer system may track how long each task takes to perform over some period of time, how much DRAM is utilized to perform the tasks, etc. Based on this tracking, the computer system can generate performance metric data that is indicative of this processing performance. Performance metric data may include, for example, aggregations of various performance metrics such as an average processing time and/or average DRAM utilization. The computer system can then use such historical performance metric data to train a machine learning model to determine capture criteria based on one or more inputs such as current capture criteria, current performance metrics, etc. For example, a machine learning model may be trained to produce values for the one or more configurable parameters through the use of tools such as Naïve Bayes classifiers, support vector machines, random forests, artificial neural networks, etc. The parameter values output by the machine learning model can be used to generate an updated capture criterion. The allocation policy 222 can then be configured based on the updated capture criterion, for example, by replacing previous capture criteria and/or supplementing previous capture criteria.

Figure 3:
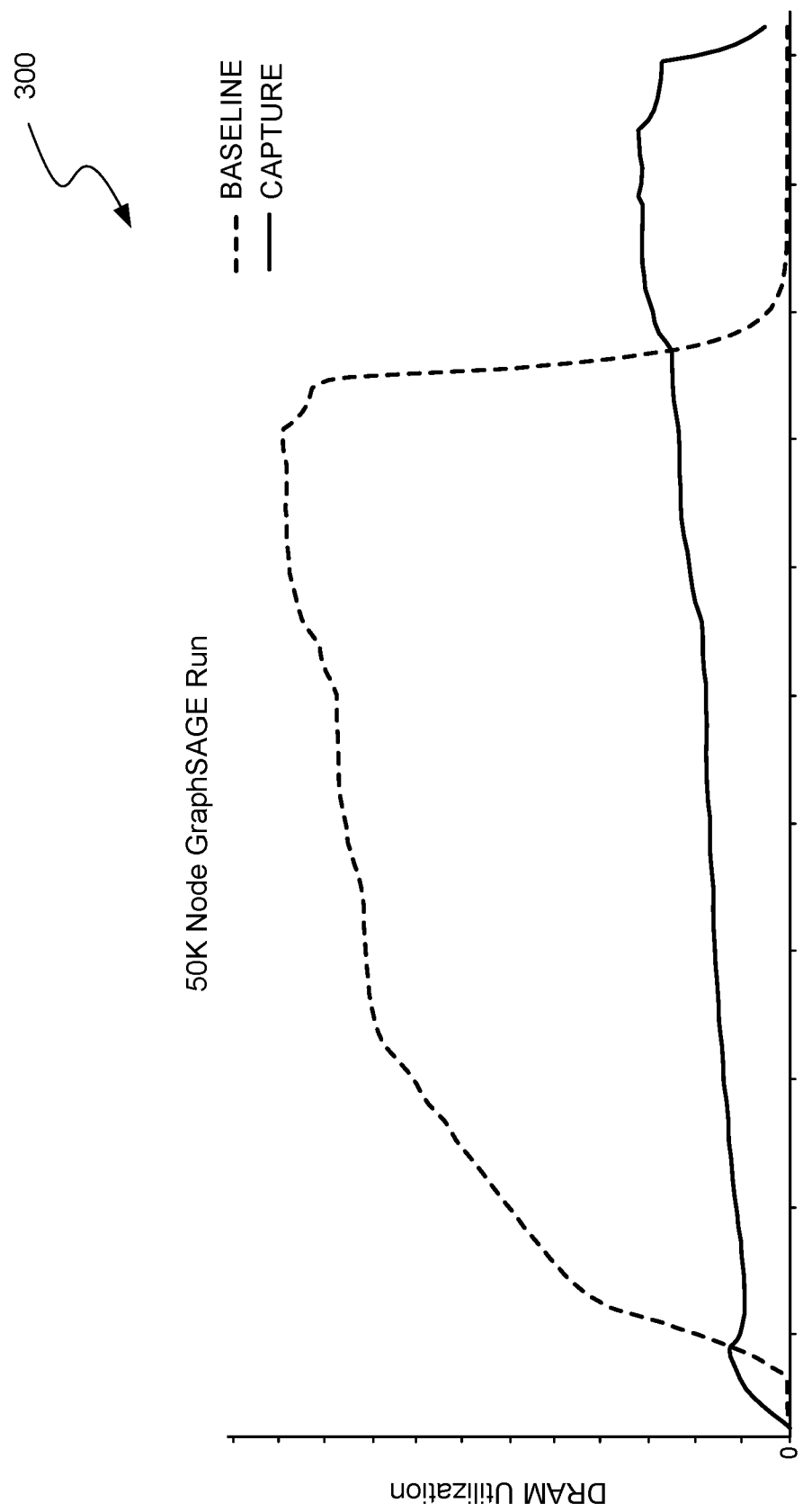
FIG. 3 shows a chart illustrating how volatile memory utilization can be reduced by using the introduced technique for capturing memory calls from an application.

The introduced technique for applying an allocation policy to captured memory calls allows DRAM, which would normally be allocated, to be freed in favor of local and/or remote PMEM. By offloading certain tasks to be handled by PMEM (which is typically available in greater abundance than DRAM), the introduced technique can significantly lower overall DRAM utilization without negatively impacting application performance. FIG. 3 shows a chart 300 that illustrates how DRAM utilization can be reduced by using the introduced technique for capturing memory calls from an application. Specifically, FIG. 3 charts DRAM utilization over time by a GrapSAGE machine learning application using a baseline technique and the introduced capture technique. As illustrated in FIG. 3, the introduced capture technique results in significantly lower DRAM peak utilization and does not lead to a significant increase in overall processing time.

The chart 300 depicted in FIG. 3 is provided to illustrate how the introduced technique can improve the operation of a computer system by reducing DRAM utilization, but is not intended to represent results in all configurations. Actual processing results in any given embodiment will depend on a number of different factors including the allocation policy 222 applied to capture memory calls from an application. For example, a timing study was conducted to determine how capture of various types of memory calls from GraphSAGE affected overall performance. A machine learning application such as GraphSAGE can make various types of memory allocations. As part of the timing study, an allocation policy was configured to capture various combinations of one or more of the following types of allocations: 256 KB allocations for loading, MAP_STACK allocations, MAP_NORESERVE allocations, and the malloc( ) family of allocations. Enabling capture of 256 KB allocations slowed down processing time by about 12% over baseline (i.e., no capture) but resulted in DRAM savings of about 65% over baseline. Enabling capture of malloc( ) calls slowed down processing time by about 17% over baseline but resulted in DRAM savings of about 23% over baseline. Conversely, enabling capture of MAP_STACK calls resulted in little impact on DRAM usage or processing time and enabling capture of MAP_NORESERVE calls increased processing time by about 10% without significantly reducing DRAM usage. The result of the timing study conducted using GraphSAGE demonstrated that for the tested system, the most significant benefit was realized by applying an allocation policy to only capture 256 KB allocations and to capture malloc( ) calls, when needed. The results from this example timing study are provided to demonstrate the benefit of a configurable allocation policy for selectively capturing memory calls over capturing all memory calls from an application. However, the results of this timing study are not intended to represent the performance for all applications. A different application and/or a different type of processing job using GraphSAGE may lead to different results.

Figure 4:
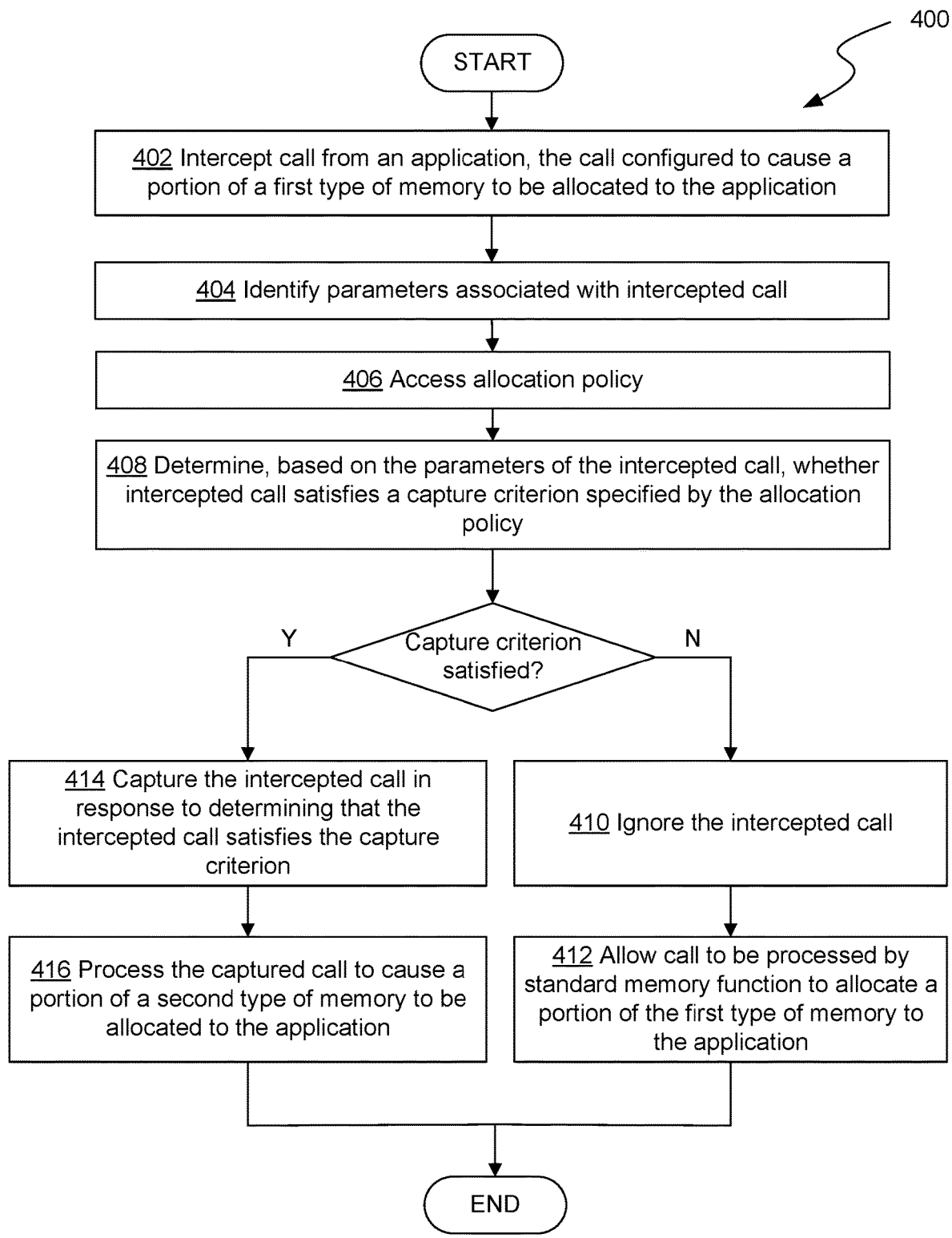
FIG. 4 shows a flow diagram of an example process for applying an allocation policy to capture memory calls from an application.

FIG. 4 shows a flow diagram of an example process 400 for applying an allocation policy to capture memory calls from an application. Certain operations of the example process 400 are described with reference to components described with respect to FIG. 2 and/or FIG. 11. Example process 400 can be executed by one or more of the components of a computer system such as the example processing system 1400 described with respect to FIG. 14. For example, in some embodiments, the example process 400 depicted in FIG. 4 may be represented in instructions stored in memory that are then executed by a processor. The process 400 described with respect to FIG. 4 is an example provided for illustrative purposes and is not to be construed as limiting. Other processes may include more or fewer operations than depicted, while remaining within the scope of the present disclosure. Further, the operations depicted in example process 400 may be performed in a different order than is shown.

Example process 400 begins at operation 402 with intercepting a call from an application. For example, as described with respect to FIG. 2, a memory allocation capture library 220 may be configured to intercept one or more calls from an application 110 that are intended for a memory function 112 such as malloc( ) or mmap( ). Such calls may be configured to cause a portion (i.e., a chunk) of a first type of memory to be allocated to the application 110 to process a task. In some embodiments, the first type of memory is DRAM that is local to an execution computer system that is executing the application 110.

Example process 400 continues at operation 404 with identifying one or more parameters associated with the intercepted call. The one or more parameters may include, for example, the type of call (e.g., malloc( ), mmap( ), etc.), a size of a mapping associated with the memory call (e.g., 256 KB vs. 2 MB, etc.), certain flags in mappings associated with the memory call (e.g., MAP_STACK, MAP_NORESERVE, etc.), the application where the memory call originated (e.g., a specific application identifier), the type of the application where the memory call originated (e.g., a machine learning application vs. other types of applications), etc. In some embodiments, the one or more parameters of an intercepted call may further include timing information associated with the call such as a time of day when the call was intercepted, a period of time elapsed since the call was intercepted, etc. Other types of parameters can similarly be determined based on the intercepted call.

In some embodiments, identifying the one or more parameters associated with the intercepted call may include processing data included in the call to determine, extract, infer, or otherwise obtain information indicative of the one or more parameters. For example, an intercepted call may include data indicative of a source of the call (e.g., the application 110), a destination for the call (e.g., a specific memory function 112 such as malloc( ) or mmap( )), a size of a mapping (e.g., 256 KB)), etc. In some embodiments, certain parameters may not be immediately evident based on data included in the call. For example, the memory allocation capture library 220 may infer that the call is from a machine learning application such as TensorFlow based on available information included in the call and/or external to the call even if such information does not specifically identify the application as a machine learning type application.

Example process 400 continues at operation 406 with accessing an allocation policy that specifies one or more capture criteria. For example, as described with respect to FIG. 2, a memory allocation capture library 220 may access an allocation policy that specifies one or more capture criteria that can be applied to determine whether to capture an intercepted call.

Example process 400 continues at operation 408 with determining, based on the one or more parameters of the intercepted call whether the intercepted call satisfies the one or more capture criteria specified by the allocation policy. In some embodiments, operation 408 may include comparing the one or more parameters associated with the intercepted call to the capture criteria specified by the allocation policy and determining, based on the comparison, whether the one or more parameters substantially match the capture criteria. For example, a capture criterion may specify that all calls to the malloc( ) family of memory functions are to be captured. The malloc( ) family refers to a set of multiple functions for dynamic memory allocation in the C programming language that include, for example, malloc( ), realloc( ), calloc( ), and free( ). Accordingly, if the intercepted call is to any of these memory functions, the captured criterion is satisfied. Conversely, if the intercepted call is to mmap( ) the capture criterion is not satisfied. As another illustrative example, a capture criterion may specify that all calls for mappings under 1 MB are to be captured. Accordingly, if a memory call is intercepted for a 256 KB mapping (e.g., for loading), the capture criterion is satisfied. Conversely, if the intercepted memory call is for a 2 MB mapping, the capture criterion is not satisfied.

If, based on the determination at operation 408, the one or more capture criteria are not satisfied, example process 400 continues to operation 410 with ignoring the intercepted call and at operation 412 with allowing the ignored call to be processed by the intended destination function (e.g., malloc ( ), mmap( ), etc.) to allocate a portion of the first type of memory (e.g., DRAM) to the application. In other words, if the one or more capture criteria are not satisfied, the memory allocation capture library 220 will take no further affirmative actions with regard to the intercepted call and will instead allow the call to proceed through the normal memory allocation and management channels associated with the execution computer system where the application is executing. In most cases, this will mean that the memory call from the application will be handled using local DRAM at the execution computer system.

If, based on the determination at operation 408, the one or more capture criteria are satisfied, example process 400 instead continues to operation 414 with capturing the intercepted call. In this context, the operation of "capturing" a call means that the call is not allowed to directly proceed through the normal memory allocation and management channels associated with the execution computer system and is instead handled using an alternative approach. For example, as shown in FIG. 4, operation 400 continues at operation 416 with processing the captured call to cause a portion of a second type of memory (different than the first type) to be allocated to the application. In embodiments where the first type of memory is DRAM, the second type of memory may include local and/or remote PMEM. In some embodiments, the second type of memory may include a DMO which itself includes local and/or remote PMEM distributed across multiple nodes.

In some embodiments, processing the captured call at operation 416 may include transmitting, generating, communicating, or otherwise invoking a system call to an operating system kernel associated with the execution computer system to allocate the portion of the second type of memory (assuming it is locally available). For example, as described with respect to FIG. 2, the memory allocation capture library 220 may make a system call 204b to the operating system kernel 116 to cause a chunk 219b of PMEM 218 to be allocated to application 110. Similar to a memory function 112, in such embodiments, the memory allocation capture library 220 will process one or more parameters associated with the captured memory call and then generate a separate second call to the operating system kernel (e.g., system call 204b). However, while the system call 204a from the memory function 112 may, by default, cause an allocation in the first type of memory (i.e., DRAM), the system call 204b from the memory allocation capture library 220 will, by default, cause an allocation in the second type of memory (e.g., local PMEM 218b).

In some embodiments, processing the captured call at operation 416 may instead include transmitting, generating, communicating, or otherwise invoking a call to some other API (e.g., a different memory function) to handle the memory allocation request. For example, as described with respect to FIG. 2, in some embodiments, the memory allocation capture library 220 may make a second memory function call 203 to another API 212. This second memory function call 203 may be based on the one or more parameters associated with the captured call 202b from the application 110.

Figure 11:
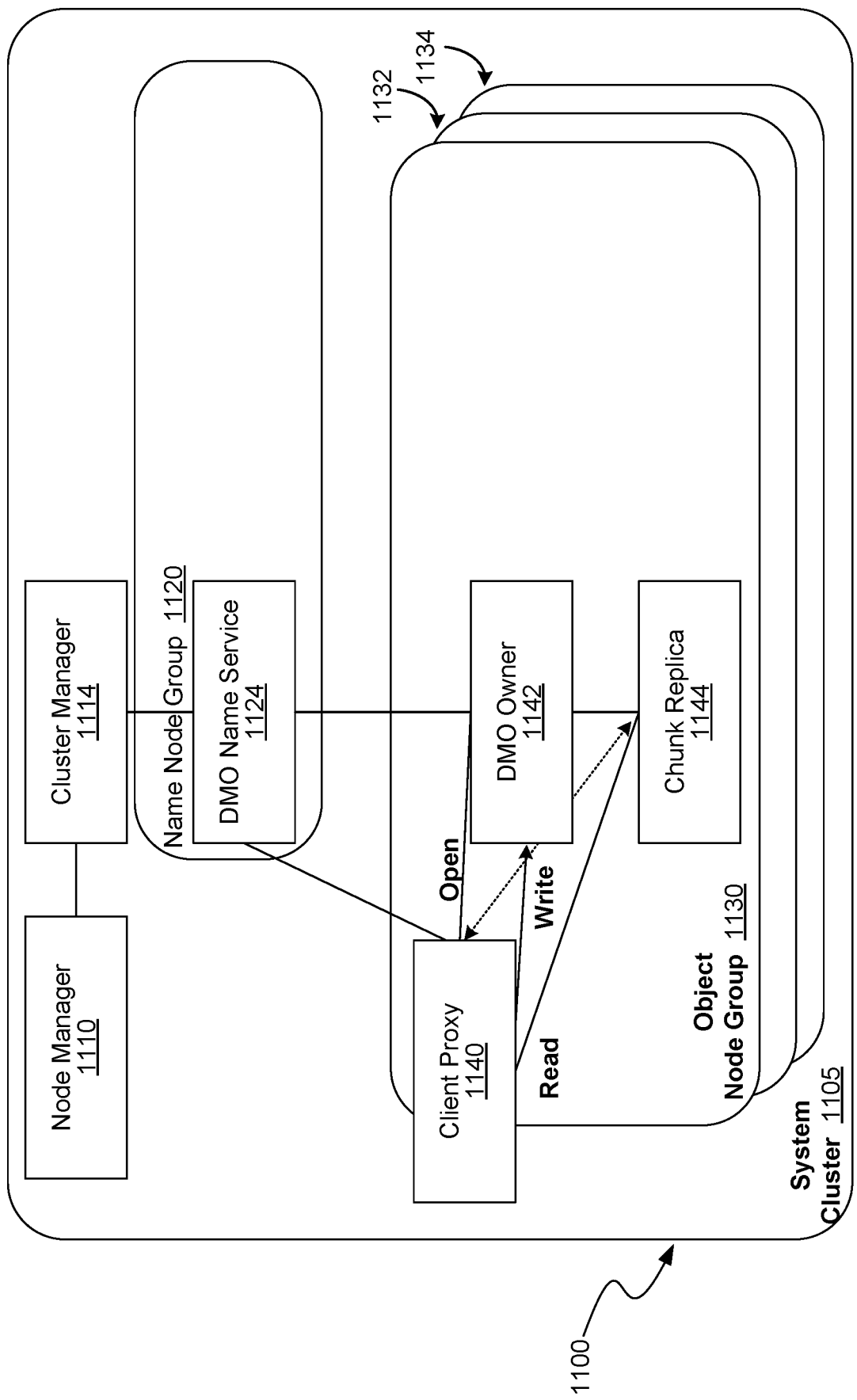
FIG. 11 shows a diagram illustrating an example distributed memory object (DMO) system.

In some embodiments, this other API 212 may be an API associated with a DMO system (e.g., DMO system 1100 described with respect to FIG. 11). In other words, in response to determining that a captured call satisfies the one or more capture criteria specified by an allocation policy 222, the memory allocation capture library 220 may make a second call 203 to a DMO API that causes a DMO system 1100 to create a new memory mode (volatile or persistent) DMO and/or allocate a portion of an existing memory mode DMO to handle the request from the application.

Multi-Level Caching

In many computing systems, the address space available to applications can be increased beyond the limits of local physical DRAM through a memory management technique generally referred to as "virtual memory." In a typical virtual memory context, a kernel-level virtual memory manager can create and manage address maps for application operations, leverage available local HDD to store inactive pages, and manage the copying of pages into physical memory when needed. As alluded to above, such virtual memory management is implemented at the kernel level of an operating system which presents a challenge when allocating alternative memory resources such as PMEM using, for example, the previously described memory allocation capture library 220.

One solution to address this issue includes reconfiguring the kernel-level virtual memory manager and/or providing an application with access to the operating system kernel to manage memory allocations. As previously discussed, making changes to and/or providing access to an operating system kernel introduces security concerns since the operating system kernel has access to everything in a computer system.

Instead, in some embodiments, a technique for multi-level caching can be applied as a use-space process to deploy various types of physical memory such as volatile memory (e.g., DRAM), local PMEM, and/or remote PMEM, for example, based on resource availability and application page accesses. In some embodiment, the introduced technique for multi-level caching can be performed using a memory allocation capture library, for example, similar to the memory allocation capture library 220 described with respect to FIG. 2. Notably, the introduced technique for multi-level caching, which can perform much of the functionality of a kernel-level virtual memory manager, can be implemented completely in user mode with no need for custom kernel components.

Figure 5A:
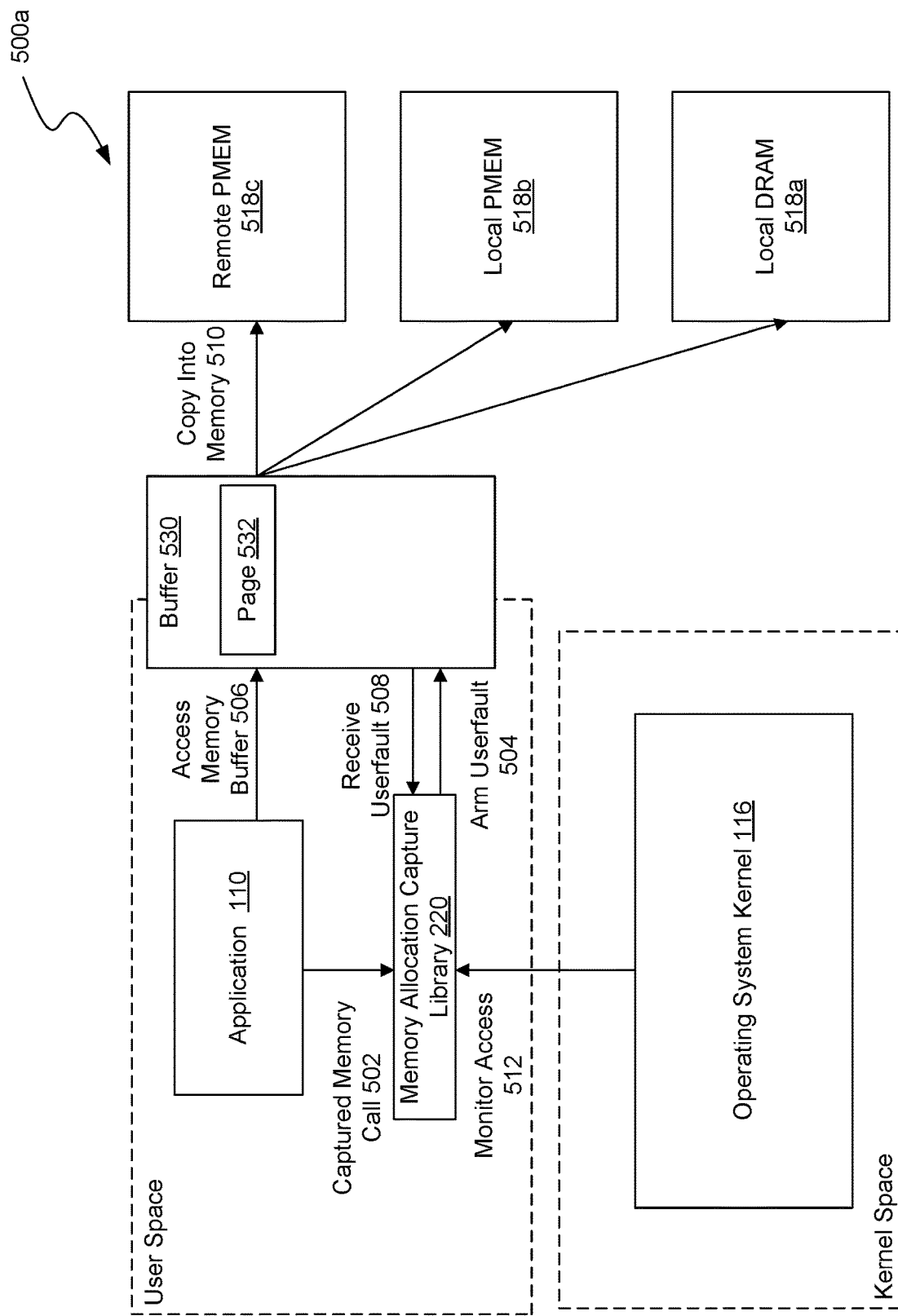
FIG. 5A shows an architecture flow diagram illustrating an example process for multi-level caching.

FIG. 5A shows a diagram illustrating an example process 500a for multi-level caching, according to an example embodiment. As described with respect to FIG. 2, a memory allocation capture library 220 can be configured to intercept, and in some cases, capture memory calls from an application 110. For example, FIG. 5A depicts the memory allocation capture library 220 capturing a memory call 502 from application 110. In some embodiments, the memory call 502 is captured in response to applying an allocation policy, for example, as described with respect to FIG. 2

In response to capturing the memory call 502, the memory allocation capture library 220 may, at operation 504, arm a memory buffer 530 for user-space page fault notification. For example, the Linux operating system provides a mechanism generally referred to as userfault that enables certain virtual memory functionalities (e.g., on-demand paging) to be performed in user-space as opposed to at the kernel level. While certain embodiments are described in the context of the userfault feature of Linux, a person having ordinary skill in the art will recognize that other mechanisms for user-space page fault notification that are specific to other operating systems or environments can similarly be implemented.

A "page fault" occurs when an application attempts to access a block of memory (i.e., a page) that is not stored in physical memory (e.g., DRAM). In a virtual memory context, a page fault notifies an operating system that it must locate the data in virtual memory (e.g., at a physical storage device such as an HDD) and transfer that data into physical memory (e.g., DRAM). The userfault mechanism of Linux can be applied to enable a user-space process to receive page fault notifications when an application attempts to access a block of memory (i.e., a page) that is not stored in physical memory.

In some embodiments, arming the memory buffer 530 for user-space page fault notification at operation 504 may include registering an address range in the memory buffer 530 for page fault notification. The address range may include one or more pages in the memory buffer such as page 532 depicted in FIG. 5A. Note, the arrow associated with operation 504 is depicted as directed to the memory buffer 530 to illustrate the arming of the memory buffer for page fault notification; however, this is not to be construed as limiting. For example, in the case of userfault, operation 504 may include invoking a userfaultfd system call to the operating system kernel 116.

Once armed, the memory buffer 530 will generate an initial page fault notification in response to the application 110 attempting to access, at operation 506, data within the registered address range of the buffer (e.g., page 532). Notably, by responding to an initial page fault notification, the memory allocation capture library can defer assignment of actual memory resources (e.g., local volatile memory 518a, local PMEM 518, and or remote PMEM 518c until the application 110 actually needs to access data from memory. In other words, in response to receiving a user-space page fault notification at operation 508, the memory allocation capture library 220 will at operation 510 copy, swap, or otherwise move data for the memory buffer 530 into one of several available physical memory devices such as local DRAM 518a, local PMEM 518b, and/or remote PMEM 518c. For example, in response to receiving an initial user-space page fault notification indicating that the application has attempted to access page 532, the memory allocation capture library 220 may cause the data associated with page 532 to be copied, swapped, or otherwise moved into one of several available physical memory devices such as local DRAM 518a, local PMEM 518b, and/or remote PMEM 518c.

In some embodiments, in response to receiving an initial user-space page fault notification indicating that the application has attempted to access page 532, the memory allocation capture library 220 may cause the data associated with page 532 to be copied, swapped, or otherwise moved into one of the local memory devices such as local DRAM 518a or local PMEM 518b, but not into remote PMEM 518c. That is, in some embodiments the system may be configured to fault into only local memory resources and not into remote memory resources such as remote PMEM 518c. In such embodiments, data may be evicted from a local memory device (e.g., local DRAM 518a or local PMEM 518b) into remote PMEM 518c and can then be fault-restored back into local memory, for example, by monitoring page accesses.

The specific physical memory resource selected may depend on several factors such as the relative capacities of each of the available physical memory resources, real-time usage of each of the available physical memory resources, parameters associated with the portion of the memory buffer 530 (e.g., page 532) to be placed into memory (e.g., size, fragmentation, etc.), the type of application 110 requesting access (e.g., machine-learning vs. other applications), etc. For example, in some embodiments, the memory allocation capture library 220 will default to move data into local DRAM 518a as long as available capacity and current usage permits. If local DRAM 518a does not have available capacity and/or no other data can be evicted from local DRAM 518a, the memory allocation capture library 220 may instead elect to move data into local PMEM 518b. Similarly, if local PMEM 518b does not have available capacity and/or no other data can be evicted from local PMEM 518b, the memory allocation capture library 220 may instead elect to move data into remote PMEM 518c. This is just an example allocation scheme provided for illustrative purposes and is not to be construed as limiting. For example, as mentioned, in some embodiments, the memory allocation capture library 220 may select a particular physical memory resource based on certain parameters associated with the portion of the memory buffer 530 (e.g., page 532) to be placed into memory. Recall, that in the context of one TensorFlow application, experimentation revealed that replacing a 2 MB buffer used for computation with PMEM had a large negative impact on performance while replacing a 256 KB buffer for preprocessing with PMEM had little negative impact on performance.

The userfault mechanism was originally developed to enable post-copy migration of a virtual machine from one node to another. For example, the one or more memory mappings associated with a virtual machine running at a first node could be armed for userfault to allow a user-space process to migrate each mapping to a second node in response to an application accessing the memory mappings. Accordingly, the userfault mechanism is configured to only issue a single notification in response to detected access of a page that is not in memory. This works for migration because, once the userfault mechanism is triggered, the data is migrated, and the process concludes.

The single trigger aspect of the userfault mechanism presents a challenge in a memory allocation context where you may need to evict underutilized data from memory. For example, to optimize use of limited amounts of physical memory (e.g., local DRAM 518a, local PMEM 518b, and/or remote PMEM 518c), a memory allocation process may need to continually identify data that applications are accessing to place into memory and identify data that applications are not accessing to evict from memory. Accordingly, a solution is needed to identify candidates for eviction.

One solution involves an active approach that relies on the application 110 actively identifying portions of in-memory data that are no longer needed and communicating that information to a memory management process, for example, performed by the memory allocation capture library 220. However, this solution requires modification by an application developer of the application 110 to cause it to take an active role in identifying eviction candidates. For reasons stated earlier, relying on customization of an application 110 to make use of the introduced techniques may not be practical or feasible in many situations.

Alternatively, in some embodiments, a process for rearming the memory buffer 530 for user-space page fault notification can be performed to enable the use, for example, of the userfault mechanism to automatically identify candidates for eviction without the need for any active steps by the application 110. For example, after populating the selected physical memory with data from the memory buffer 530 in response to an initial userfault, the memory allocation capture library 220 may rearm the memory buffer 530 for user-space page fault notification. In an example embodiment, rearming the memory buffer 530 for user-space page fault notification includes creating a new demand-zero page outside the memory buffer 530 mapped range, arming this new demand-zero page for user-space page fault notification (e.g., using userfault), and moving the newly armed page onto the memory buffer 530, page to be evicted, for example, using a mremap( ) call.

Rearming the user-space page fault notification enables the memory allocation capture library 220 to monitor page fault information, for example, received from the operating system kernel 116 at operation 512, to identify candidates for eviction. In some embodiments, the memory allocation capture library 220 may monitor page fault information exported by a kernel memory manager through interfaces such as /proc/kpageflags and/or /sys/kernel/mm/page_idle. This enables the memory allocation capture library 220 to determine which pages continued to be accessed and which pages are candidates for eviction (e.g., due to lack of access by the application 110) if memory requirements exceed capacity.

Figure 5B:
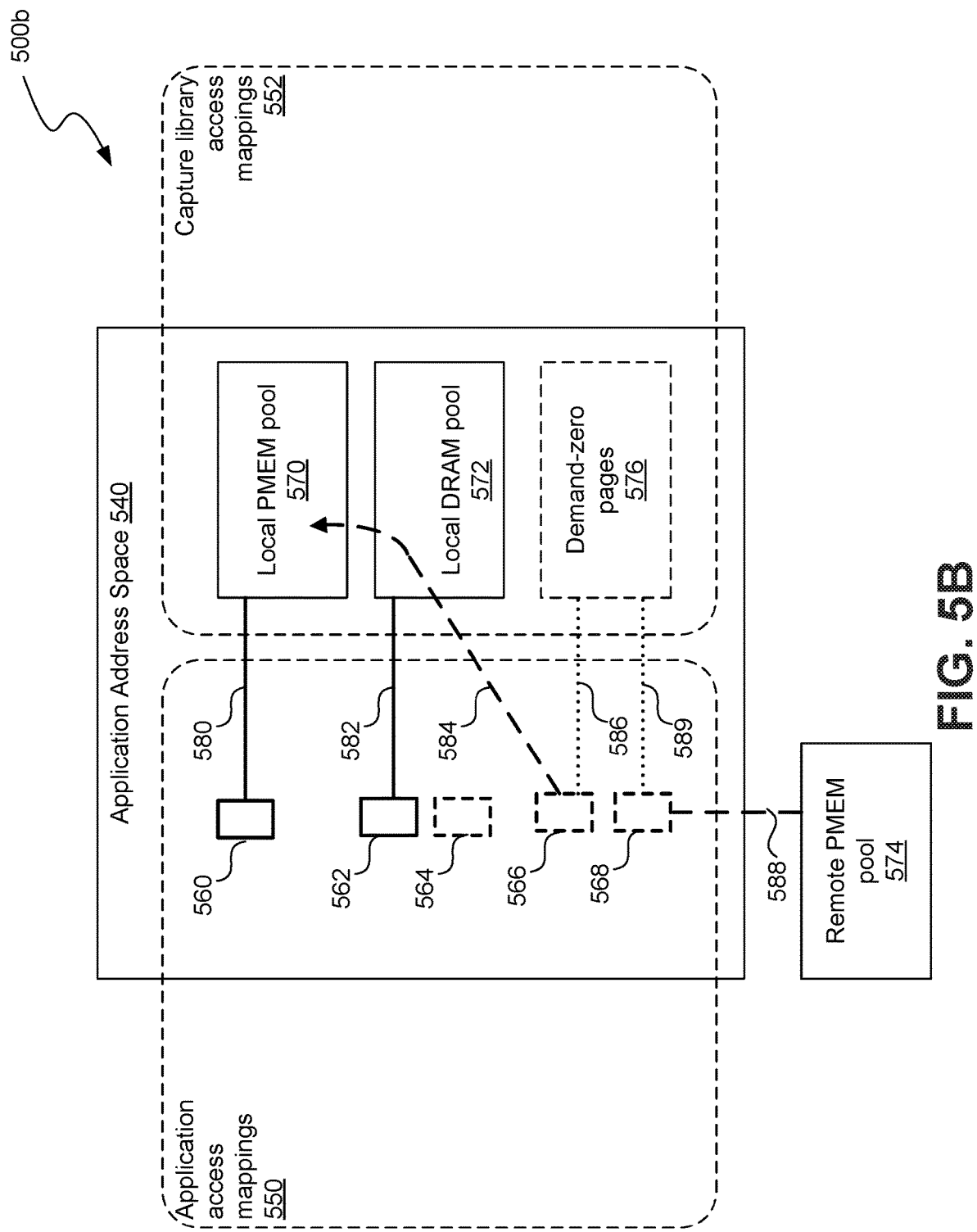
FIG. 5B shows a diagram that illustrating how an application address space can include multiple mapped views.

In some embodiments, the introduced technique for multi-level caching can include multiple mappings of the allocated space: one for an application's 110 view and one management activity, for example, by the allocation capture library 220. In such embodiments, the application view only includes mapping operations applied to it whereas any movement of data occurs in the management view. FIG. 5B shows a diagram 500b that illustrates this concept involving multiple mappings.

As shown in FIG. 5B, certain embodiments of the introduced technique may apply multiple mappings to an application address space 540, namely, application access mappings 550 and capture library access mappings 552. The application access mappings 550 may be part of a first view of the application address space 540 that is viewable to an application such as application 110 (i.e., an application view). Conversely, the capture library access mappings 552 may be part of a second view of the application address space 540 that is viewable to a user-space memory management function (i.e., management view). In some embodiments, this user-space memory management function is, or is part of, the memory allocation capture library 220.

Within the applications access mappings 550 shown in FIG. 5B are multiple different pages 560, 562, 564, 566, and 568. In some cases, pages in the application access mappings 550 may be mapped into a local memory pool. For example, page 560 is mapped into the local PMEM pool 570 as indicated by line 580. In other words, the data mapped to page 560 is located in an allocation in the local PMEM pool 570. As another example, page 562 is mapped into the local DRAM pool 572 as indicated by line 582.

In some cases, pages in the application access mappings 550 may not yet be mapped into a local allocation memory pool, but may be armed for user-space page fault notification. Such pages may be mapped in several different cases. For example, page 564 is initially mapped but without a backing store allocation. As another example, page 566 is soft-evicted (i.e., temporarily unmapped from the application view) from one of the local memory pool allocations to, for example, evaluate if the application 110 is actively using it and/or to move the page from one pool to another. In the example, depicted in FIG. 5B, page 566 was previously allocated to the DRAM pool 572 (as indicated by line 584), but has been soft-evicted to move the page into the local PMEM pool 570 (as indicated by the arrow at the end of line 584). Soft-eviction, in this context means that the mapping has changed without necessarily moving the physically allocated data. During the temporary soft-eviction, page 566 may be a demand-zero page 576 from the capture library view as indicated by the as indicated by eviction map line 586. As another example, page 568 has been hard-evicted from the local memory into a remote PMEM pool 574 as indicated by line 588. Hard-eviction, in this context, means that the mapping has changed and that the physically allocated data has been moved to an unmappable resource (e.g., remote PMEM). Again, from the capture library access view, page 568 may be a demand zero page 576 as indicated by line 598.

Figure 6A:
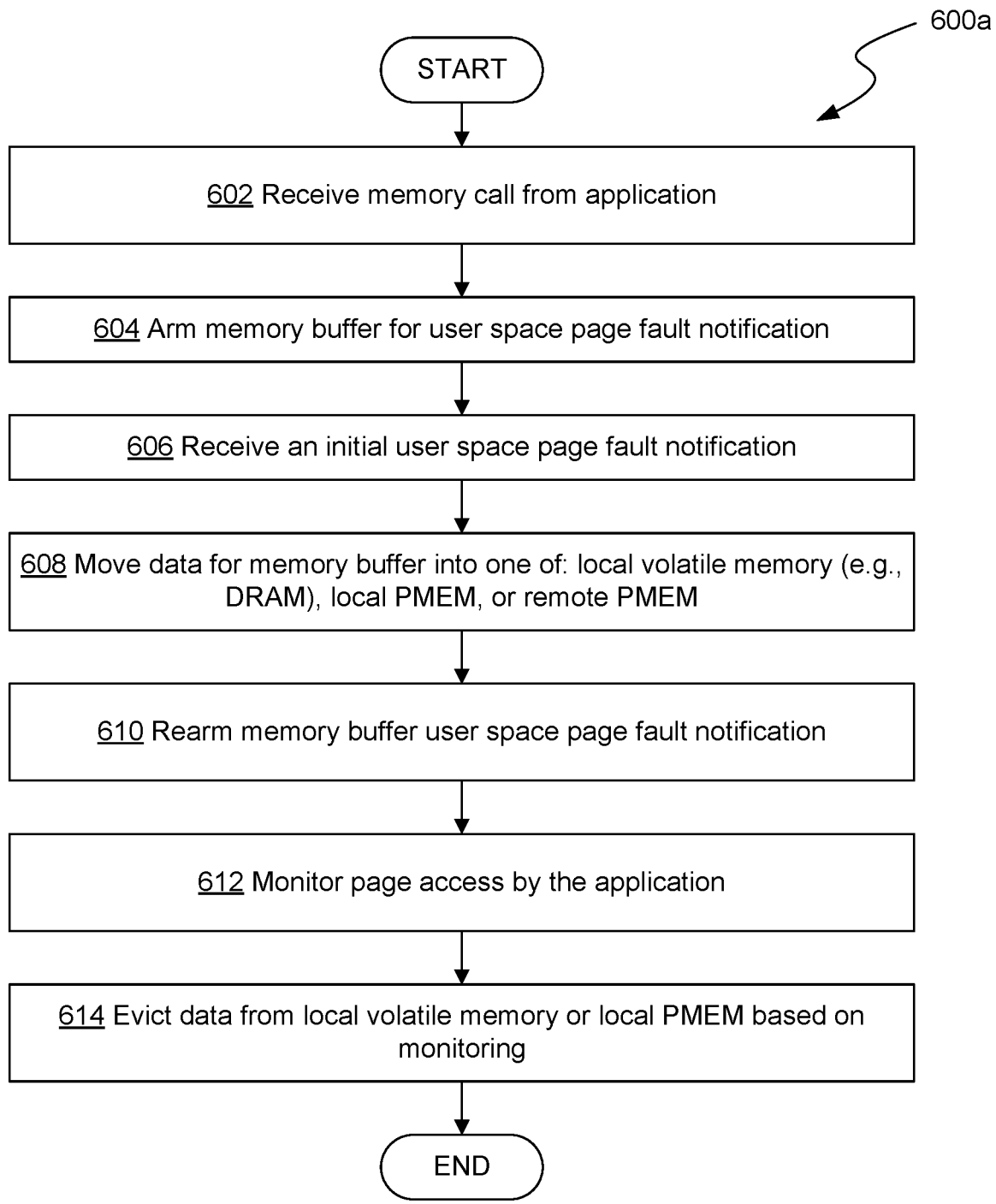
FIG. 6A shows a flow diagram of an example process for applying multi-level caching according to an embodiment of the introduced technique.

FIG. 6A shows a flow diagram of an example process 600a for applying multi-level caching according to an embodiment of the introduced technique. Certain operations of the example process 600a are described with reference to components described with respect to FIG. 5A and/or FIG. 11. Example process 600a can be executed by one or more of the components of a computer system such as the example processing system 1400 described with respect to FIG. 14. For example, in some embodiments, the example process 600a depicted in FIG. 6A may be represented in instructions stored in memory that are then executed by a processor. The process 600a described with respect to FIG. 6A is an example provided for illustrative purposes and is not to be construed as limiting. Other processes may include more or fewer operations than depicted, while remaining within the scope of the present disclosure. Further, the operations depicted in example process 600a may be performed in a different order than is shown.

Example process 600a begins at operation 602 with receiving a memory call from an application. For example, as described with respect to FIG. 5A, a memory allocation capture library 220 may be configured to intercept one or more calls from an application 110 that are intended for a memory function 112 such as malloc( ) or mmap( ). Such calls may be configured to cause a portion of memory to be allocated to the application 110 to process a task.

Example process 600a continues at operation 604 with arming a memory buffer for user-space page fault notification. In some embodiments, arming the memory buffer for user-space page fault notification may include registering an address range in the memory buffer for page fault notification, for example, by invoking a userfault system call. The address range may include one or more pages in the memory buffer such as page 532 depicted in FIG. 5A.

Example process 600a continues at operation 606 with receiving an initial user-space page fault notification (e.g., an initial userfault). The initial user-space page fault notification may indicate a detected initial access by an application of one or more pages in the memory buffer that are not yet populated in a physical memory device such as a local volatile memory device, a local PMEM device, or a remote PMEM device.

In response to the initial user-space page fault notification, example process 600a continues at operation 608 with copying, swapping, or otherwise moving data for the memory buffer into any one of a local volatile memory device (e.g., DRAM), a local PMEM device, or a remote PMEM device. For example, in response to receiving an initial userfault indicating an initial access by an application of a particular page in the memory buffer, data associated with that particular page may be copied, swapped, or otherwise moved into physical memory.

In some embodiments, before moving data into physical memory, example process 600a may include an operation (not depicted in FIG. 6A) for selecting between two or more levels of physical memory (e.g., any two or more of: local volatile memory device (e.g., DRAM), local PMEM, or remote PMEM). The specific physical memory resource selected may depend on several factors such as the relative capacities of each of the available physical memory resources, real-time usage of each of the available physical memory resources, parameters associated with the portion of the memory buffer to be placed into memory (e.g., size, fragmentation, etc.), the type of application requesting access (e.g., machine-learning vs. other applications), etc.

In some embodiments, for captured allocation calls, local PMEM may be selected by default and allocated to the application. While an application task is running using the allocated local PMEM, the application task may be promoted into an allocation in local volatile memory (e.g., DRAM) in response to determining, for example, that the application task's level of access of the allocated local PMEM satisfies a specified access criterion (e.g., exceeds a threshold number of page accesses). Further, while the application task is running in the allocated local volatile memory, the application task may be demoted back into local PMEM in response to determining that the application task's level of access of the allocated local volatile memory does not satisfy a specified access criterion. Note that in some embodiments, the specified access criteria used for promoting into local volatile memory and demoting out of local volatile memory may be different. Similarly, if local PMEM is under pressure (e.g., demand is nearing or exceeds capacity), one or more local PMEM allocations (e.g., least used, most recently allocated, etc.) can be evicted to remote PMEM. Pages in remote PMEM can be brought back into either local volatile memory or local PMEM, for example, in response to detecting (e.g., based on a heuristic using a page's history) that the page is re-accessed by the application and/or satisfies some specified access criterion.

In other embodiments, local volatile memory (e.g., DRAM) may be selected by default provided the local volatile memory has sufficient capacity to handle the data associated with an accessed page. The local PMEM and/or remote PMEM can therefore serve as an alternative when the local volatile memory does not have sufficient capacity. For example, in some embodiments, selecting a particular physical memory device may include determining that the local volatile memory (e.g., DRAM) does not have capacity to handle the data associated with an accessed page and then selecting one of the local PMEM or remote PMEM instead. In such embodiments, selecting the particular physical memory device may further include determining that the local PMEM does not have sufficient capacity to handle the data associated with the particular page and then selecting remote PMEM instead.

Returning to FIG. 6A, example process 600a continues at operation 610 with rearming the memory buffer (or a particular page in the memory buffer) for user-space page fault notification. As previously discussed, in some embodiments, rearming the memory buffer for user-space page fault notification may include creating a new demand-zero page in the memory buffer that is outside a mapped range, arming this new demand-zero page for user-space page fault notification (e.g., using userfault), and moving the newly armed page into the evited buffer 530, for example, using a mremap( ) call.

Example process 600a continues at operation 612 with monitoring page accesses by an application to, for example, identify candidates for eviction. As previously mentioned, in some embodiments, monitoring page access may include monitoring page fault information exported by a kernel memory manager via an interface such as /proc/kpageflags or /sys/kernel/mm/page_idle. In some embodiments, the monitoring is performed in real-time, or near-real-time (i.e., within seconds or fractions of a second), as an application is accessing pages in memory. In some embodiments, monitoring the page fault information may include continually retrieving, receiving, or otherwise accessing page fault information over a specified or open-ended period of time, processing the page fault information accessed over that period of time, and generating values for one or more metrics related to levels of access based on the processing. Such metrics may include, for example, a calculated total number of times an application accessed a particular page over the period of time, an average number of times the application accessed the particular page per time period (e.g., per minute, etc.), a maximum/minimum number of times the application accessed the particular page per time period (e.g., per minute), a total amount of time a page has remained idle (i.e., not accessed by the application), etc. These are just example metrics related to levels of access and are not to be construed as limiting. Other metrics may similarly be determined by processing page fault information.

Example process 600a continues at operation 614 with evicting data from local physical memory (i.e., any of the local volatile memory (e.g., DRAM) or local PMEM). In some embodiments, operation 614 may include determining, for example, based on the monitoring performed at operation 612, that a level of access by the application does not satisfy a specified access criterion. For example, the determined level of access may be represented by any one or more of the aforementioned metrics (e.g., number of pages accesses, amount of time a page has remained idle, etc.). A corresponding access criterion may include a threshold value associated with any one or more of the metrics. For example, operation 614 may include comparing a determined value for a given metric (e.g., amount of time a page has remained idle) against a threshold value for that metric (e.g., 1 minute). In this example, if the value for the metric exceeds the threshold value, the access criterion is not satisfied. This is just an example access criterion and is not to be constructed as limiting. Other types of access criterion may similarly be specified including target values for a metric (as opposed to thresholds), specific ranges of values for a metric, etc.

In some embodiments, one or more access criteria used to identify eviction candidates may be specified based on inputs from a user 252, for example, via interface 253. For example, using interface 253, a user 252 may provide an input that specifies a threshold value for a particular metric related to memory access by an application. An access criterion may then be generated based on the input threshold value for the particular metric.

In some embodiments, one or more access criteria used to identify eviction candidates may be automatically generated or updated using machine learning techniques. For example, various other performance metrics (e.g., processing time, DRAM utilization, etc.) may be used as feedback data to train a machine learning model to determine and/or update one or more access criteria. The access criteria for identifying eviction candidates may therefore continually update as the system learns to identify eviction candidates that result in optimal system performance.

In some embodiments, the decision to evict data from physical memory may further be based on a current available capacity at the physical memory device. In other words, even if the access criteria are not satisfied, data may be left in physical memory as long as the physical memory has sufficient available capacity. As such, in some embodiments, operation 614 may also include determining an available capacity of a physical memory device (e.g., in terms of bytes, frames, etc.), determining that the available capacity in the physical memory does not satisfy one or more specified capacity criteria (e.g., a threshold level of available capacity), and electing to evict data from physical memory in response to determining that the available capacity does not satisfy the one or more specified capacity criteria. As with the access criteria, in some embodiments, the capacity criteria may be generated and/or updated based on inputs from a user and/or using machine learning.

Figure 6B:
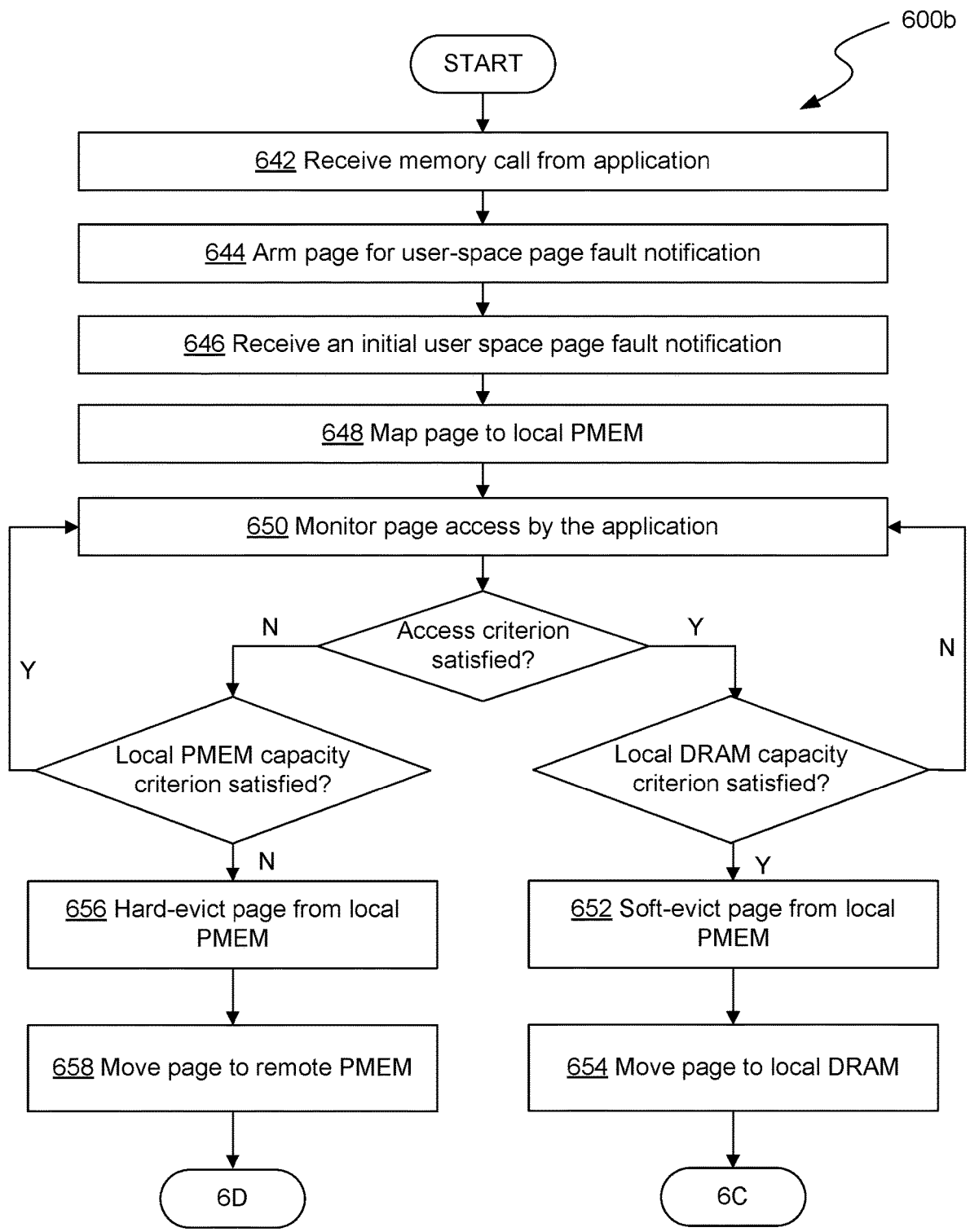
FIG. 6B-6D show a series of flow diagrams of a set of example processes for applying multi-level caching according to another embodiment of the introduced technique.
Figure 6C:
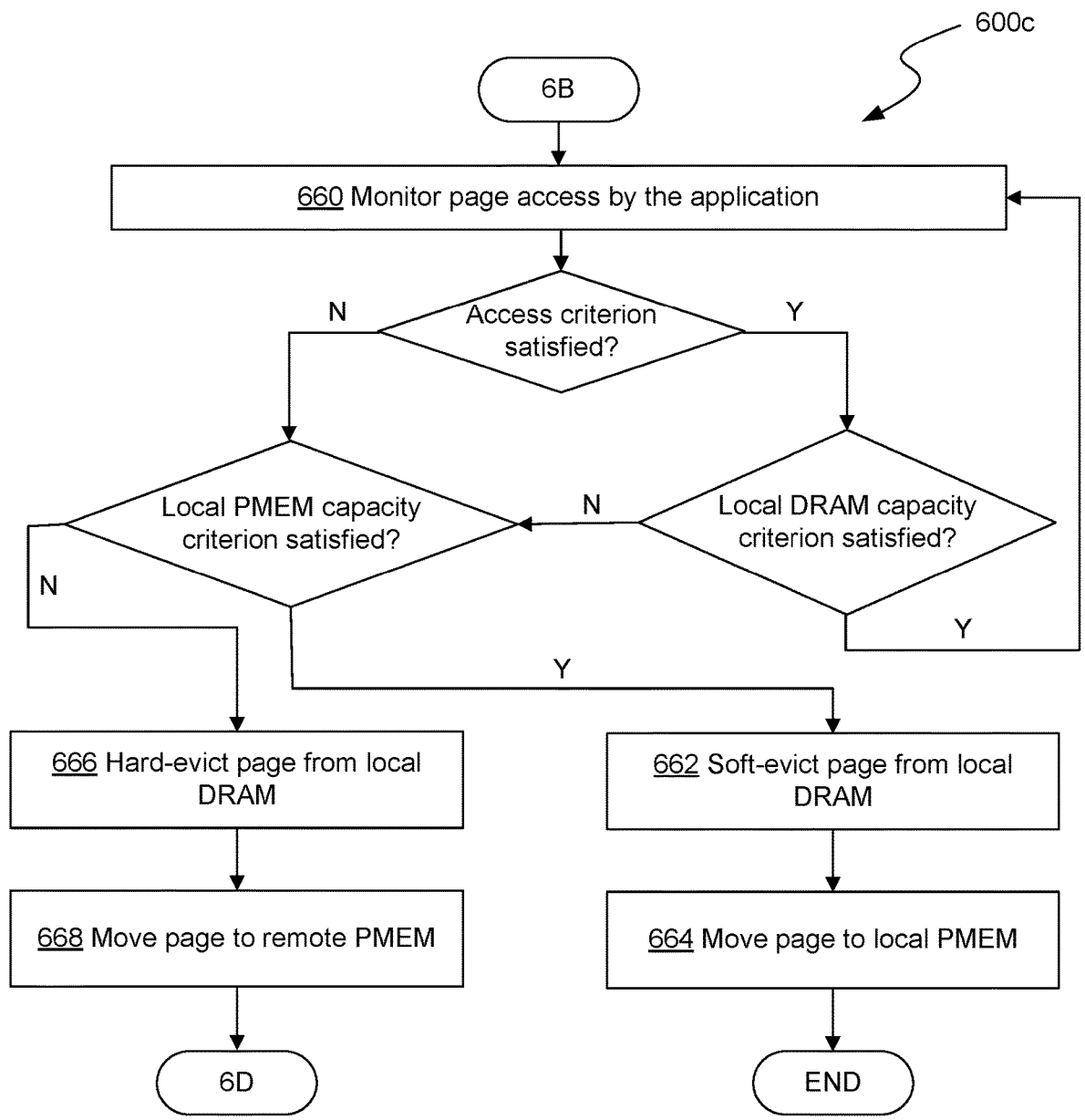
Figure 6D:
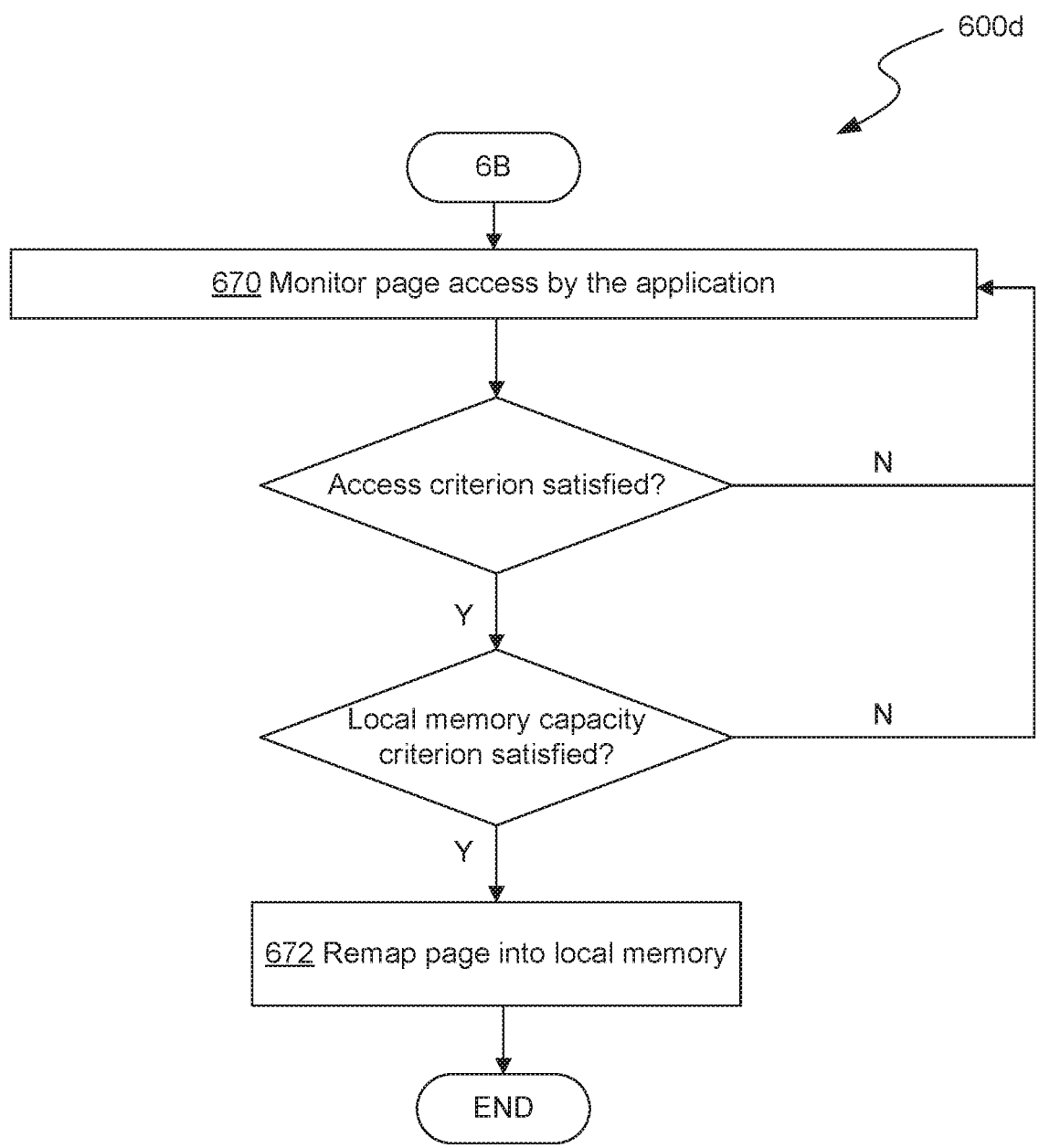

FIGS. 6B-6D show series of flow diagrams of a set of example processes 600b-d for applying multi-level caching according to another embodiment of the introduced technique. Certain operations of the example processes 600b-d are described with reference to components described with respect to FIG. 5A-5B and/or FIG. 11. The example processes 600b-d can be executed by one or more of the components of a computer system such as the example processing system 1400 described with respect to FIG. 14. For example, in some embodiments, the example processes 600b-d depicted in FIGS. 6B-6D may be represented in instructions stored in memory that are then executed by a processor. The processes 600b-d described with respect to FIGS. 6B-D are examples example provided for illustrative purposes and are not to be construed as limiting. Other processes may include more or fewer operations than depicted, while remaining within the scope of the present disclosure. Further, the operations depicted in example processes 600b-d may be performed in a different order than is shown.

Example process 600b depicted in FIG. 6B begins at operation 642 with receiving a memory call from an application. For example, as described with respect to FIG. 5A, a memory allocation capture library 220 may be configured to intercept one or more calls from an application 110 that are intended for a memory function 112 such as malloc( ) or mmap( ). Such calls may be configured to cause a portion of memory to be allocated to the application 110 to process a task.

Example process 600b continues at operation 644 with arming a page for user-space page fault notification. In some embodiments, arming the memory buffer for user-space page fault notification may include registering an address range in an application address space 540 associated with the page for user-space page fault notification, for example, by invoking a userfault system call. As described with respect to FIG. 5B, the application address space 540 may include two mappings: one for an application view and another for a management view (e.g., for the allocation capture library 220). The page armed at operation 644 may be initially mapped in the application view, but without any backing store allocated, for example, as described with respect to page 564 in FIG. 5B.

Example process 600b continues at operation 646 with receiving an initial user-space page fault notification (e.g., an initial userfault). The initial user-space page fault notification may indicate a detected initial access by an application of the page armed at operation 644.

In response to the initial user-space page fault notification, example process 600b continues at operation 648 with mapping the page into a local memory pool allocation. Specifically, in the example embodiment depicted in FIG. 6B, the page is mapped to an allocation in local PMEM. For example, the page may be mapped to a local PMEM pool 570 as shown in FIG. 5B. In some embodiments, mapping the page to the local PMEM may include copying, swapping, or otherwise moving data associated with the page into a local PMEM device. Following operation 648, the page is mapped to the local PMEM pool (i.e., part of capture library mappings 552), for example, as described with respect to page 560 in FIG. 5B.

Although not depicted in FIG. 6B, in some embodiments, example process 600b may continue with rearming the page for user-space page fault notification, for example, as described with respect to operation 610 of process 600a.

Example process 600b continues at operation 650 with monitoring page access by the application, for example, as described with respect to operation 612 of process 600a.

Example process 600b continues with determining whether an access criterion is satisfied. For example, a determined level of access may be represented by any one or more metrics (e.g., number of pages accesses, amount of time a page has remained idle, etc.). A corresponding access criterion may include a threshold value associated with any one or more of the metrics. For example, if the value for a metric (e.g., number of page accesses) exceeds the threshold value, the access criterion is satisfied. This is just an example access criterion and is not to be constructed as limiting. Other types of access criterion may similarly be specified including target values for a metric (as opposed to thresholds), specific ranges of values for a metric, etc.

If the access criterion is satisfied, the page may be a candidate for promotion into local volatile memory (e.g., DRAM) to improve processing performance. Before moving the page into local volatile memory, the example process 600b may include determining if the local volatile memory has adequate capacity. In other words, example process may include determining whether a capacity criterion (e.g., a threshold level of available capacity) associated with the local volatile memory is satisfied. If the capacity criterion associated with the local volatile memory is not satisfied (e.g., because local DRAM is overutilized), the page remains mapped to the local PMEM and example process 600b returns to operation 650 to continue monitoring the page accesses by the application. If the capacity criterion is satisfied, example process 600b continues with promoting the page into local volatile memory, for example, by soft-evicting the page from local PMEM (at operation 652) and moving the evicted data associated with the page from local PMEM into local volatile memory (e.g., local DRAM) (at operation 654). In some embodiments, soft-evicting the page includes temporarily unmapping the page from the application view, for example, as described with respect to page 566 in FIG. 5B. Note, although not depicted in FIG. 6B, in some embodiments, example process 600b may include allocating a portion of local volatile memory (e.g., based on a size of the page) before soft-evicting the page from local PMEM and moving the page to local volatile memory. Following operation 654, the page is mapped (in the application view) to local volatile memory, for example, as described with respect to page 562 in FIG. 5B.

If the access criterion is not satisfied, for example, because the application is infrequently accessing the page, the page may be a candidate for hard-eviction. In some embodiments, a determination on whether to hard-evict a page may also depend on the available capacity in local PMEM. For example, as shown in FIG. 6B, example process 600b continues with determining whether a capacity criterion associated with the local PMEM is satisfied. If the local PMEM capacity criterion is satisfied (e.g., because local PMEM has above a threshold level of capacity) the system may elect to keep the page mapped to local PMEM whereby example process 600b returns to operation 650 to monitoring the page accesses by the application. If the local PMEM capacity criterion is not satisfied, example process 600b continues at operation 656 with hard-evicting the page from local PMEM and at operation 658 with moving data associated with the page to remote PMEM. Note, although not depicted in FIG. 6B, in some embodiments, example process 600b may include allocating a portion of remote PMEM (e.g., based on a size of the page) before hard-evicting the page from local PMEM and moving the page to remote PMEM. Following operation 658, the page is no longer mapped to the application view and is instead moved to remote PMEM (i.e., an unmappable resource), for example, as described with respect to page 568 in FIG. 5B.

FIG. 6C shows a flow chart of an example process 600c which represents a continuation of example process 600b depicted in FIG. 6B. Specifically, the example process 600c depicted in FIG. 6C may occur after a page has been promoted from local PMEM into local volatile memory (e.g., DRAM), for example, at operation 654 in example process 600b.

As shown in FIG. 6C, example process 600c continues from operation 654 with monitoring, at operation 660, page access by the application. Such monitoring may be performed, for example, as described with respect to operation 612 of process 600a.

Example process 600c continues with determining whether an access criterion is satisfied based on the monitoring. For example, a determined level of access may be represented by any one or more metrics (e.g., number of pages accesses, amount of time a page has remained idle, etc.). A corresponding access criterion may include a threshold value associated with any one or more of the metrics. For example, if the value for a metric (e.g., number of page accesses) exceeds the threshold value, the access criterion is satisfied. This is just an example access criterion and is not to be constructed as limiting. Other types of access criterion may similarly be specified including target values for a metric (as opposed to thresholds), specific ranges of values for a metric, etc.

If the access criterion is satisfied (e.g., because the application has accessed the page a threshold number of times), example process 600c continues with determining if the local volatile memory has adequate capacity to continue handling the page. In other words, example process 600c may include determining whether a capacity criterion (e.g., a threshold level of available capacity) associated with the local volatile memory (e.g., DRAM) is satisfied. If the capacity criterion associated with the local volatile memory is satisfied, the page remains in local volatile memory (e.g., DRAM) and the example process returns to operation 660 to continue monitoring the page accesses by the application. If the capacity criterion associated with the local volatile memory is not satisfied (e.g., because local DRAM is overutilized), the page may be a candidate for soft-eviction to local PMEM and/or hard-eviction to remote PMEM.

If the access criterion is not satisfied (e.g., because the application has not accessed the page above a threshold number of times), the page may be a candidate for soft-eviction into local PMEM and/or hard-eviction to remote PMEM. As shown in FIG. 6C, the decision on whether to soft-evict the page to local PMEM or hard-evict the page to remote PMEM may be based on available capacity in local PMEM. In other words, example process 600c may include determining whether a capacity criterion (e.g., a threshold level of available capacity) associated with the local PMEM is satisfied. If the capacity criterion associated with the local PMEM is satisfied (e.g., because the local PMEM has sufficient available capacity), example process 600c may continue with soft-evicting the page from local volatile memory (e.g., DRAM) (at operation 662) and moving the soft-evicted page into local PMEM (at operation 664). Note, although not depicted in FIG. 6C, in some embodiments, example process 600c may include allocating a portion of local PMEM (e.g., based on a size of the page) before soft-evicting the page from local volatile memory and moving the page to local PMEM. Following operation 664, the page is mapped (in the application view) to local PMEM, for example, as described with respect to page 560 in FIG. 5B. If the capacity criterion associated with the local PMEM is not satisfied (e.g., because local PMEM is overutilized), example process 600c may continue with hard-evicting the page from local volatile memory (e.g., DRAM) (at operation 666) and moving data associated with the page to remote PMEM (at operation 668). Note, although not depicted in FIG. 6C, in some embodiments, example process 600c may include allocating a portion of remote PMEM (e.g., based on a size of the page) before hard-evicting the page from local volatile memory and moving the page to remote PMEM. Following operation 668, the page is no longer mapped to the application view and is instead moved to remote PMEM (i.e., an unmappable resource), for example, as described with respect to page 568 in FIG. 5B.

FIG. 6D shows a flow chart of an example process 600cd which represents a continuation of example process 600b depicted in FIG. 6B. Specifically, the example process 600d depicted in FIG. 6D may occur after a page has been hard-evicted from local PMEM to remote PMEM, for example, at operation 658 in example process 600b. Note, example process 600d may also be performed after a page has been hard-evicted from local volatile memory to remote PMEM, for example, at operation 668 in example process 600c.

As shown in FIG. 6D, example process 600d continues from operation 658 (or 668) with monitoring, at operation 670, page access by the application. Such monitoring may be performed, for example, as described with respect to operation 612 of process 600a.

Example process 600c continues with determining whether an access criterion is satisfied based on the monitoring. For example, a determined level of access may be represented by any one or more metrics (e.g., number of pages accesses, amount of time a page has remained idle, etc.). A corresponding access criterion may include a threshold value associated with any one or more of the metrics. For example, if the value for a metric (e.g., number of page accesses) exceeds the threshold value, the access criterion is satisfied. This is just an example access criterion and is not to be constructed as limiting. Other types of access criterion may similarly be specified including target values for a metric (as opposed to thresholds), specific ranges of values for a metric, etc. In some embodiments, the access criterion is satisfied in response to determining, for example, based on a heuristic using a page's history, that the page has been re-accessed by the application. In other, a single page access by the application after a dormant period may be enough to satisfy the access criterion.

If the access criterion is satisfied, the page may be a candidate for re-mapping back into local volatile memory (e.g., DRAM) or local PMEM. As shown in FIG. 6D, the decision on whether to remap the page back into local memory may be based on available capacity in local memory. In other words, example process 600d may include determining whether a capacity criterion (e.g., a threshold level of available capacity) associated with the local volatile memory and/or local PMEM is satisfied. If the capacity criterion is satisfied, example process 600*d* continues at operation 672 with remapping the page back into local volatile memory (e.g., DRAM) or local PMEM. This is also referred to as a fault-restore.

In some embodiments, example process 600*d* may default to local PMEM (as opposed to local volatile memory) when remapping the page back into local memory. Alternatively, example process 600*d* may include selecting one of local volatile memory (e.g., DRAM) or local PMEM based on the relative capacity of each resource when remapping the page back into local memory. In any case, in some embodiments, example process 600*d* may include allocating a portion of the local memory resource (local volatile memory or local PMEM) before remapping the page back into local memory.

Fork Handling

When an application forks a child operation (e.g., when a parent operation makes a copy of itself) while one of its private mappings have been mapped to a DAX device, the copy-on-write functionality that would normally accompany the memory buffer is not provided. As a result, changes made to the mapped buffer for the child operation would be incorrectly visible to the parent, and vice versa.

To prevent such behavior, a memory allocation library can be configured to handle application forks by, for example, cloning a separate copy of the PMEM for the child operation before the fork occurs (i.e., before the child operation is created or otherwise initiated) or after the fork occurs, for example, upon initial access by the child operation of the memory buffer.

Figure 7A:
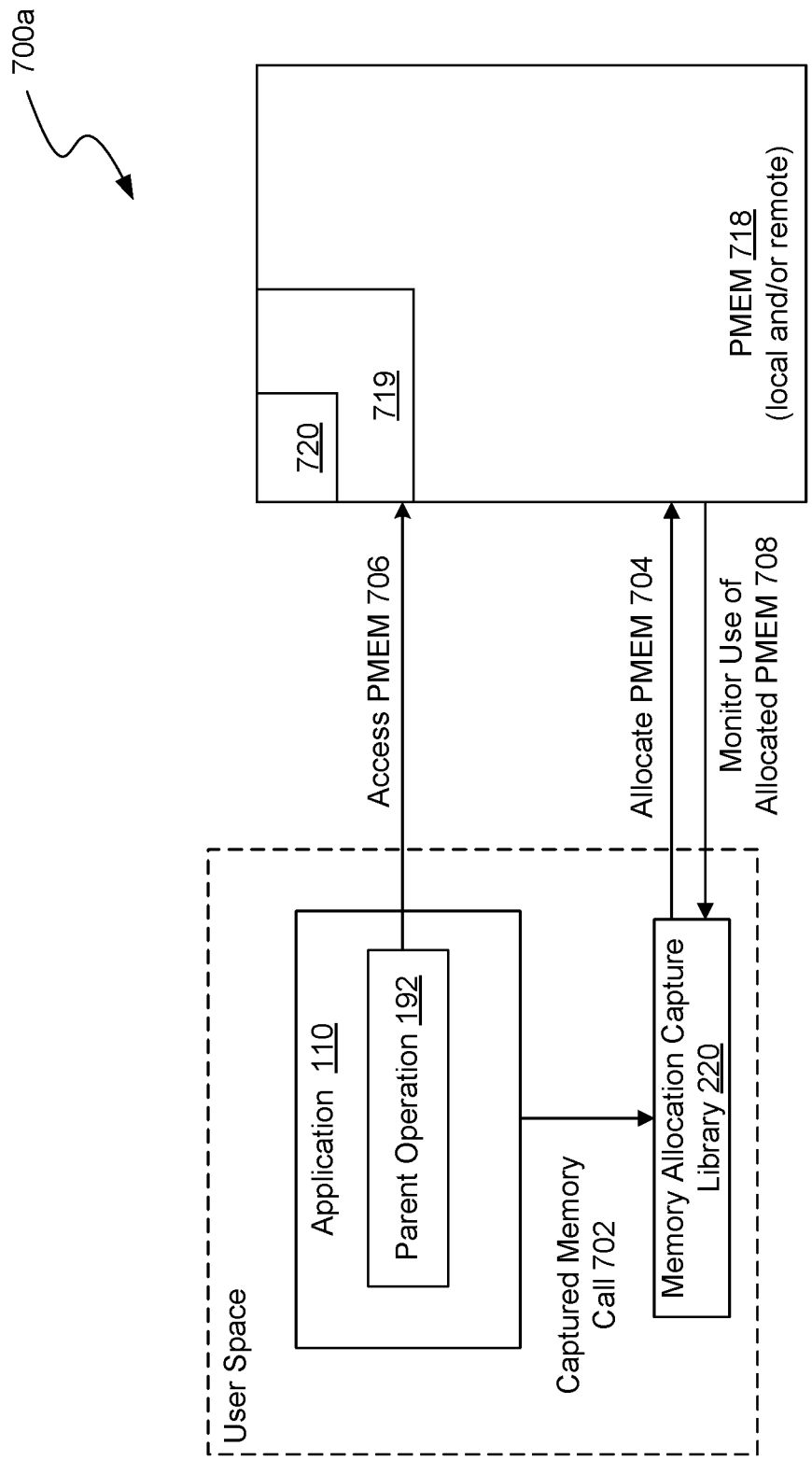
FIGS. 7A-7B show a sequence of architecture flow diagrams that illustrate an example process for handling application forks.
Figure 7B:
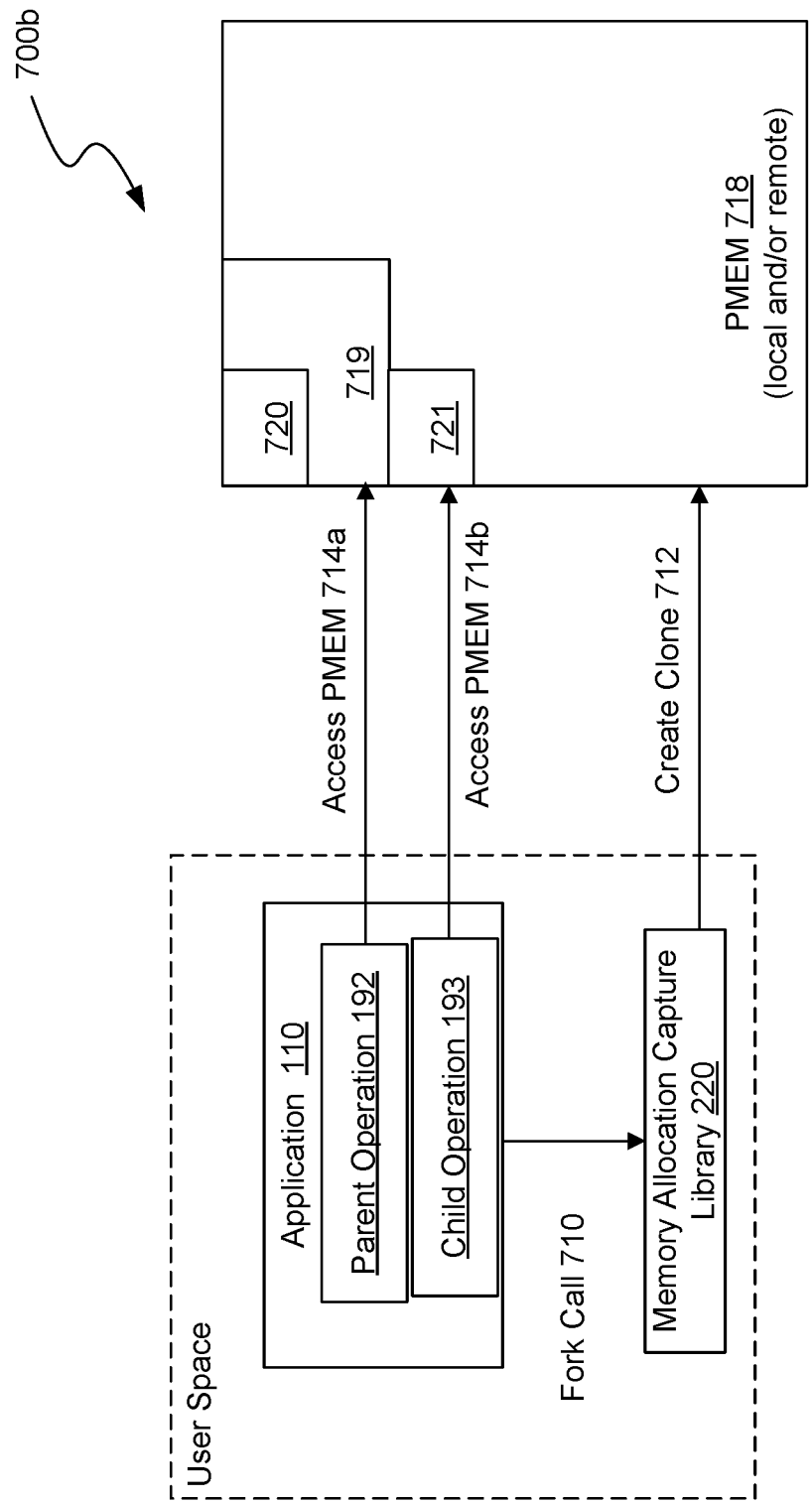

FIGS. 7A-7B show a sequence of diagrams that illustrate an example process 700*a-b* for application fork handing, according to an example embodiment. As described with respect to FIG. 2, a memory allocation capture library 220 can be configured to intercept, and in some cases, capture memory calls from an application 110. For example, FIG. 7A depicts the memory allocation capture library 220 capturing a memory call 702 from application 110. In some embodiments, the memory call 702 is captured in response to applying an allocation policy, for example, as described with respect to FIG. 2.

In response to capturing the memory call 702, the memory allocation capture library 220 may, at operation 704, allocate PMEM 718 for use by the application. For example, the memory call 702 may be associated with a request by the application 110 for memory to facilitate processing by a parent operation 192. In response, the memory allocation capture library may allocate a portion 719 of the PMEM 718 for use by the parent operation 192. At operation 706, the parent operation is enabled to access the allocated portion 719 of PMEM 718, for example, to facilitate processing associated with an application task.

The amount of the allocated portion 719 of PMEM 718 may be based on a request included in the captured memory call 702. For example, the parent operation 192 may include in the memory call 702 an upfront request for a particular amount of PMEM. Under existing techniques, if that parent operation eventually forked into a child operation it would require creating a clone of the full amount of PMEM allocated to the parent operation. Depending on the amount initially allocated, this may represent a significant amount of data to copy. Consider, for example, a large-scale data processing operation with 40 GB of PMEM allocated to it. If that operation forks to create a child operation, it would require duplicating all 40 GB which may take a minute or so, thereby causing the application to freeze for a minute while the clone is created.

To improve processing efficiency, the introduced technique can instead create a clone of the PMEM that is based on a portion of the allocated PMEM that is actually being used by the parent operation 192. Accordingly, as depicted in FIG. 7A, example process 700*a* may include, at operation 708, monitoring the actual usage of the allocated PMEM 719 by the parent operation 192. For example, based on the monitoring at operation 708, the memory allocation capture library 220 may determine that the parent operation 192 is only utilizing a portion 720 of the allocated PMEM 719. Note, the allocated PMEM 719 and portion 720 in use are depicted in FIGS. 7A-7B as rectangles of differing area to illustrate relative amounts of data. For example, based on the depiction in FIG. 7A, the portion 720 of PMEM that is in use by the parent operation 192 is smaller than the portion 719 of PMEM allocated to the parent operation 192; however, this not intended to convey anything about how the memory is allocated or used. For example, although depicted as a single block, allocated portion 719 may actually represent multiple chunks (e.g., frames) at non-consecutive address spaces.

Turning to FIG. 7B, at some point during execution of the parent operation 192, the memory allocation capture library 220 may intercept or otherwise receive a fork call 710 by the application indicating that the parent operation 192 will copy itself to create a child operation 193 (i.e., that the parent operation 192 will fork).

In response to receiving the fork call 710, the memory allocation capture library 220 may cause, at operation 712, a clone of PMEM to be created to facilitate the processing by the child operation 193. In some embodiments, the clone created at operation 712 may be based on a portion 720 of the allocated PMEM 719 that is actually in use by the parent operation 192. For example, as shown in FIG. 7B, a clone 721 of the portion 720 of PMEM is created and placed into memory.

As previously alluded to, the point at which the clone 721 is created at operation 712 may occur pre-fork (i.e., just before the child operation 193 is created) or may occur post-fork (i.e., after the child operation 193 is created). In a pre-fork configuration, the clone 721 is created in response to receiving the fork call 710, but just before the actual child operation 193 is created. Accordingly, once created, the clone 721 is available for access by the newly-created child operation 193. In a post-fork configuration, the clone 721 may instead be created after the child operation 193 is created and in response to detecting an initial access by the child operation 193 to a memory buffer. In some embodiments, user-space page fault notification (e.g., implemented using the userfault mechanism) may be used to determine when the child operation 193 first attempts to access memory. For example, in response to receiving an initial user-space page fault notification (i.e., indicating initial access by the child operation 193), the memory allocation capture library 220 may cause the clone 721 to be created in PMEM.

In some embodiments, the memory allocation capture library 220 may be configured for either pre-fork or post-fork cloning. In other words, the memory allocation capture library 220 will handle application forks using one of the two techniques regardless of outside factors. In some embodiments, the memory allocation capture library 220 may be configured by a user 252, for example via interface 253, to apply either pre-fork or post-fork cloning. Alternatively, the memory allocation capture library 220 may be configured to dynamically select either pre-fork or post-fork cloning based on one or more parameters associated with the fork call such as: the type of application initiating the fork, the type of application operation forking, the level utilization by the parent operation 193 of allocated PMEM 719, the available capacity in PMEM 718, etc. For example, in cases where it is known that both the parent operation 192 and child operation 193 will access most of the memory, it may be advantageous to create the copy pre-fork all at once to avoid future page faults. Alternatively, if it is known that the parent operation 192 and/or child operation 193 will only access a small portion of the memory, applying a post-fork cloning strategy will result in fewer memory copies.

In any case, once the application fork occurs, the parent operation 192 and child operation 193 may access data from PMEM 718 at operations 714*a* and 714*b* (respectively). For example, the parent operation 192 may at operation 714*a* continue to access data from the allocated portion 719 of PMEM, while the child operation 193 may, at operation 714*b*, access data from the clone 721 created at operation 712.

Figure 8:
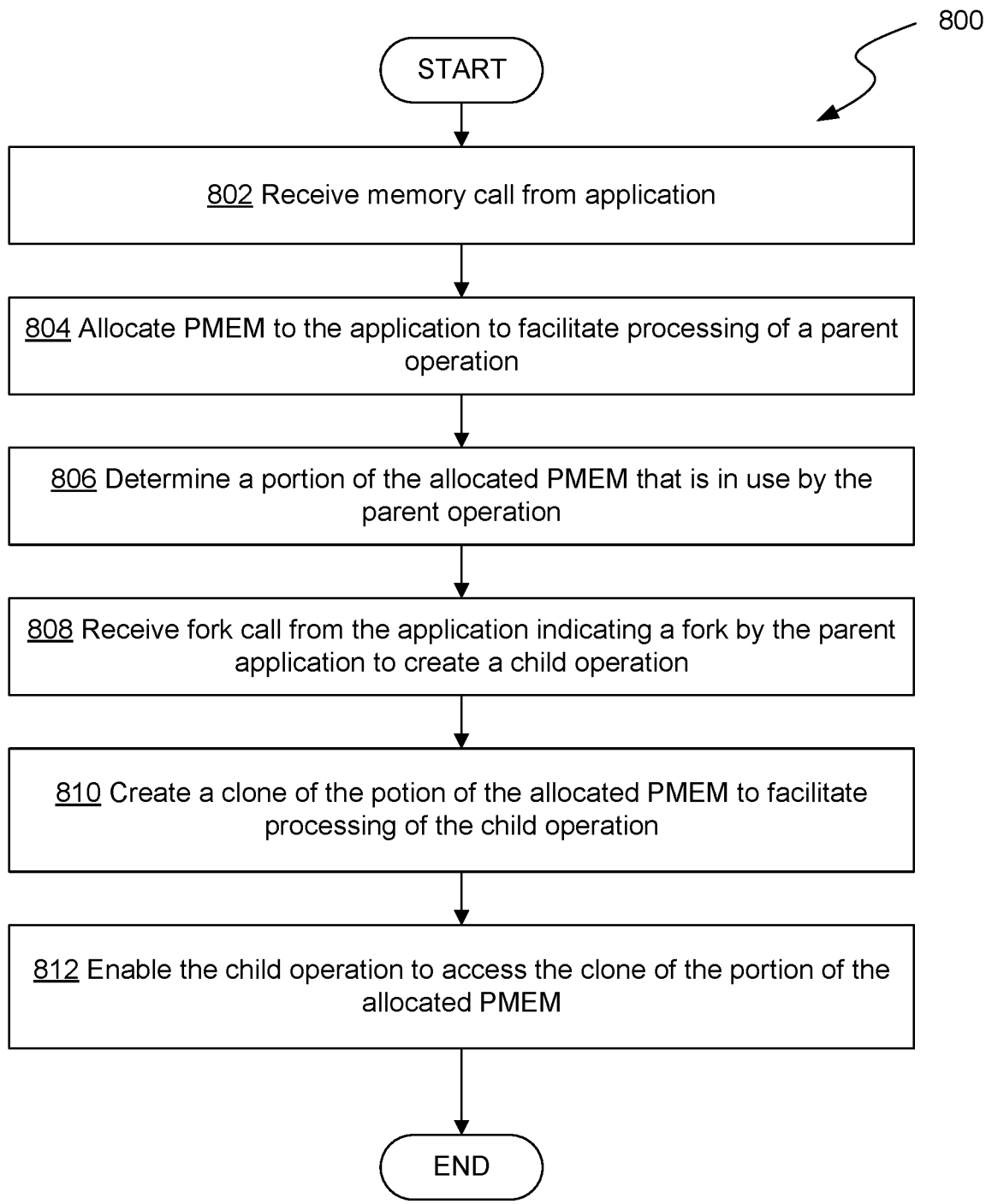
FIG. 8 shows a flow diagram of an example process for handing application forks.

FIG. 8 shows a flow diagram of an example process 800 for handing application forks according to an embodiment of the introduced technique. Certain operations of the example process 800 are described with reference to components described with respect to FIG. 7A-7B and/or FIG. 11. Example process 800 can be executed by one or more of the components of a computer system such as the example processing system 1400 described with respect to FIG. 14. For example, in some embodiments, the example process 800 depicted in FIG. 8 may be represented in instructions stored in memory that are then executed by a processor. The process 800 described with respect to FIG. 8 is an example provided for illustrative purposes and is not to be construed as limiting. Other processes may include more or fewer operations than depicted, while remaining within the scope of the present disclosure. Further, the operations depicted in example process 800 may be performed in a different order than is shown.

Example process 800 begins at operation 802 with receiving a memory call from an application. For example, as described with respect to FIG. 7A, a memory allocation capture library 220 may be configured to intercept and capture a memory call 702 from application 110. The memory call 702 may be intended for a memory function 112 such as malloc( ) or mmap( ). Such calls may be configured to cause a portion of memory to be allocated to the application 110 to process a task.

Example process 800 continues at operation 804 with allocating PMEM to the application to facilitate processing. For example, as described with respect to FIG. 7A, in response to capturing memory call 702, the memory allocation capture library 220 may cause a portion 719 of PMEM 718 to be allocated to the application to facilitate processing of an operation (i.e., the pre-fork parent operation 192).

Example process 800 continues at operation 806 with monitoring the use by the application 110 of the PMEM allocated at operation 804 to determine a portion of the allocated PMEM that is in use by application 110. In particular, example operation 808 may include monitoring the use by the parent operation 192 of the allocated portion 719 of PMEM 718. As previously discussed, at any given time, the parent operation 192 of application 110 may utilize less than all the allocated portion 719 of PMEM 718. Accordingly, operation 806 may include determining a portion of the allocated PMEM that is in use by the parent operation 192 based on the monitoring. For example, the determined portion 720 in use may represent a subset of the allocated portion 719 of PMEM 718.

In some embodiments, operation 806 may be performed continually after the portion of PMEM 719 is allocated to the application 110. For example, the memory allocation capture library 220 may be configured to periodically poll (at regular or irregular intervals) information regarding page accesses by application 110. Such polling may be performed, for example, by monitoring page fault information exported by a kernel memory manager through interfaces such as /proc/kpageflags and/or /sys/kernel/mm/page_idle.

In some embodiments, this page fault information may be processed to generate one or more metrics related to levels of access by the application 110. Such metrics may include, for example, a calculated total number of times the application 110 accessed a particular page over the period of time, an average number of times the application 110 accessed the particular page per time period (e.g., per minute, etc.), a maximum/minimum number of times the application accessed the particular page per time period (e.g., per minute), a total amount of time a page has remained idle (i.e., not accessed by the application), etc.

The one or more metrics related to levels of access by the application 110 may then be utilized to determine which portion 720 of the allocated PMEM 719 is in use and/or is predicted to be in use by the application over some time horizon. For example, the memory allocation capture library 220 may determine that a particular portion 720 is in use and/or predicted to be in use based on a tracked average number of page accesses by the parent operation 192 over a period of time.

As alluded to above, in some embodiments, the portion 720 of PMEM determined at operation 806 to be in use by an application 110 (or more specifically, parent operation 192) may actually represent a prediction of the portion of allocated PMEM 719 that will be in use. In some embodiments, this prediction can be made, for example, by processing one or more metrics related to levels of access using a machine learning model.

In some embodiments, the portion 720 of PMEM determined at operation 806 may correspond to an actual observed portion in use multiplied by some safety factor to account for unexpected spikes in usage by the parent operation. Consider, for example, a scenario in which the memory allocation capture library 220 determines, based on monitoring actual access, that the parent operation is using (or is likely to use) 2 MB out of a 10 MB allocation of PMEM. In such a scenario, the portion of allocated PMEM determined at operation 806 may represent that amount of PMEM determined based on direct monitoring (i.e., 2 MB) multiplied by a safety factor (e.g., 1.1).

Example process 800 continues at operation 808 with receiving a fork call indicative that a currently executing operation will fork to create a copy of itself. For example, with reference to FIG. 7B, operation 808 may include the memory allocation capture library 220, intercepting and capturing a fork call 710 from application 110. This fork call 710 may indicate that a currently executing parent operation 192 will fork to create a copy of itself (i.e., child operation 193).

Example process 800 continues at operation 810 with creating a clone of the portion of PMEM determined at operation 806 in response to receiving the fork call at operation 808. For example, with reference to FIG. 7B, operation 810 may include creating a clone 721 of the portion 720 of the PMEM 719 allocated to the parent operation 192.

The clone 721 created at operation 810 can then be allocated to the child operation 193 to facilitate processing of the child operation 193. Accordingly, example process 800 concludes at operation 812 with enabling the child operation 193 to access the clone 721 to facilitate such processing. Similarly, the parent operation 192 can continue to access the portion 719 of PMEM 718 allocated at operation 804.

The creation of the clone 721 at operation 810 may be performed before the application fork occurs or after the application fork occurs. For example, in some embodiments, the clone 721 may be created in response to receiving the fork call (i.e., at operation 808) but just before the parent operation 192 actually forks to create the child operation 193. Alternatively, in some embodiments, the clone 721 may be created after the fork occurs (i.e., after the child operation 193 is created).

Figure 9:
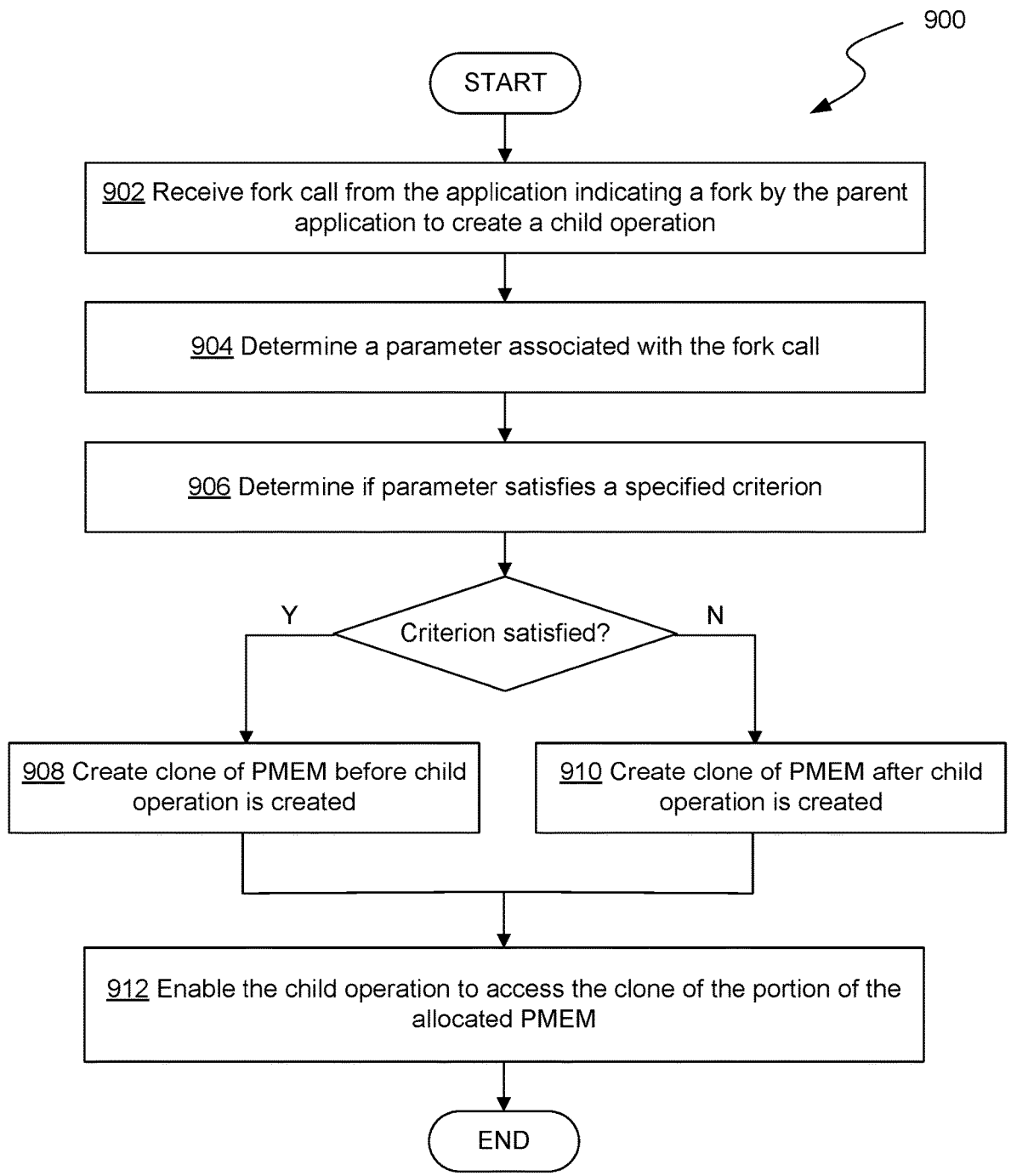
FIG. 9 shows a flow diagram of an example process for dynamically electing to clone PMEM pre-fork or post-fork.

In some embodiments, the memory allocation capture library 220 may be configured for either pre-fork or post-fork cloning. In other words, the memory allocation capture library 220 will handle application forks using one of the two techniques regardless of outside factors. In some embodiments, the memory allocation capture library 220 may instead dynamically select either pre-fork or post-fork cloning based on one or more factors. FIG. 9 shows a flow diagram of an example process 900 for dynamically selecting pre-fork or post-fork cloning according to an embodiment of the introduced technique. As with the example process 800 of FIG. 8, example process 900 can be executed by one or more of the components of a computer system such as the example processing system 1400 described with respect to FIG. 14. For example, in some embodiments, the example process 900 depicted in FIG. 9 may be represented in instructions stored in memory that are then executed by a processor. The process 900 described with respect to FIG. 9 is an example provided for illustrative purposes and is not to be construed as limiting. Other processes may include more or fewer operations than depicted, while remaining within the scope of the present disclosure. Further, the operations depicted in example process 900 may be performed in a different order than is shown.

Example process 900 begins at operation 902 with receiving a fork call from an application, for example, as described with respect to operation 808 of example process 800.

Example process 900 continues at operation 904 with determining a parameter associated with the fork call in response to receiving the fork call. The parameter determined at operation 904 may specifically relate to any one or more of the application 110 originating the fork call, the parent operation 192 to be forked, and/or the child operation 193 that will result from the fork. Such parameters may include, for example, the type of application initiating the fork (e.g., machine learning vs. non machine learning), the type of application operation forking, the level PMEM utilization by the operation that will be forked (e.g., in absolute terms or as a percentage of allocated PMEM), a predicted level of utilization by a child operation that will result from the fork, the available capacity in PMEM 718, etc.

In some embodiments, operation 904 may include processing data associated with the fork call received at operation 902 to determine the one or more parameters associated with the fork call. For example, the fork call may include such parameters or other data from which such parameters may be derived. In some embodiments, operation 904 may include receiving, retrieving, or otherwise accessing additional data indicative of the parameters in response to receiving the fork call at operation 902. For example, in response to receiving a fork call, a system performing operation 900 may query the application 110 for additional information (e.g., a type of the application and/or operation to be forked), calculate a measure (e.g., a percentage) of allocated PMEM used by a parent operation based on monitored page access information, predict a measure (e.g., a percentage) of the allocated PMEM that the parent operation will use based on the current use, etc. These are just examples of how one or more parameters associated with a fork call may be determined. Other types of operations may similarly be performed to determine such parameters.

Example process 900 continues at operation 906 with determining whether the one or more parameters satisfy a specified criterion that governs whether cloning is to be performed pre-fork or post fork. In an example embodiment, if the criterion is satisfied, example process 900 continues to operation 908 with creating the clone before the child operation is created (i.e., pre-fork). Alternatively, if the criterion is not satisfied, example process 900 continues to operation 910 with creating the clone after the child operation is created (i.e., post-fork).

The one or more criteria applied at operation 906 may differ in various embodiments. In an example embodiment based on the percentage of allocated PMEM accessed by the parent operation, a specified criteria may set a threshold percentage value. Such an embodiment may include, for example, determining, at operation 904, a percentage of the allocated PMEM 719 that a parent operation will access during processing and determining, at operation 906, whether the percentage of allocated PMEM satisfies a specified threshold criterion (e.g., 50%). In response to determining that the percentage of allocated PMEM satisfies the specified threshold criterion (e.g., is above 50%), process 900 may continue to operation 908 with creating the clone before the child operation is created (i.e., pre-fork). Conversely, in response to determining that the percentage of allocated PMEM does not satisfy the specified threshold criterion (e.g., is at or below 50%), process 900 may continue at operation 910 with creating the clone after the child operation is created. This example scenario is based on an assumption that it is advantageous to create the clone pre-fork all at once to avoid future page faults in cases where it is known that the parent operation 192 and child operation 193 will access most of their allocated memory and that it is similarly advantageous to create clone post-fork to make fewer memory copies in cases where it is known that the parent operation 192 and/or child operation 193 will only access a small portion of their allocated memory. Again, this scenario is an example provided for illustrative purposes. The one or more criteria for determining whether to create the clone pre-fork or post-fork may different in various embodiments.

In any case, once the clone is created (pre-fork or post-fork), example process 900 continues at operation 912 with enabling the child operation to access the cloned PMEM, for example, as described with respect to operation 812 of example process 800.

Figure 10:
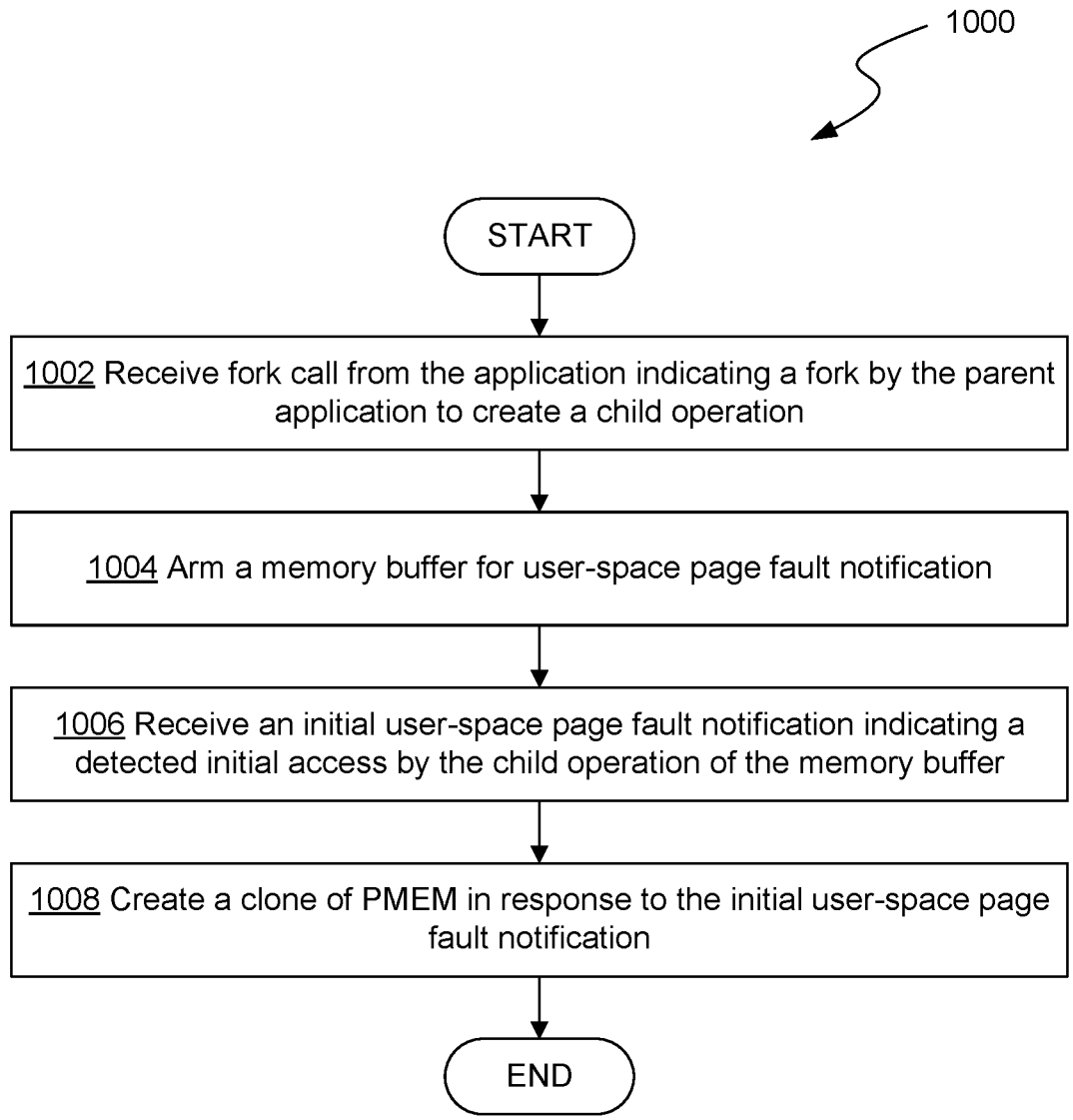
FIG. 10 shows a flow diagram of an example process for performing post-fork cloning of PMEM.

In some embodiments, performing post-fork cloning may include setting up data structures that enable the memory allocation capture library 220 to perform data copy on-demand once the child operation is created. In some embodiments, user-space page fault notification (e.g., using the userfault mechanism) can be applied to enable on-demand post-fork PMEM cloning. FIG. 10 shows a flow diagram of an example process 1000 for performing post-fork cloning according to an embodiment of the introduced technique. As with the example process 800 of FIG. 8, example process 1000 can be executed by one or more of the components of a computer system such as the example processing system 1400 described with respect to FIG. 14. For example, in some embodiments, the example process 1000 depicted in FIG. 10 may be represented in instructions stored in memory that are then executed by a processor. The process 1000 described with respect to FIG. 10 is an example provided for illustrative purposes and is not to be construed as limiting. Other processes may include more or fewer operations than depicted, while remaining within the scope of the present disclosure. Further, the operations depicted in example process 1000 may be performed in a different order than is shown.

Example process 1000 begins at operation 1002 with receiving a fork call from an application, for example, as described with respect to operation 808 of example process 800.

Example process 1000 continues at operation 1004 with arming a memory buffer for user-space page fault notification, for example, as described with respect to operation 604 of example process 600a. As described with respect to operation 604, arming the memory buffer for user-space page fault notification may include registering an address range in the memory buffer for page fault notification, for example, by invoking a userfault system call.

Example process 1000 continues at operation 1006 with receiving an initial user-space page fault notification (e.g., an initial userfault), for example, as described with respect to operation 606 of example process 600a. In this case, the initial user-space page fault notification may indicate a detected initial access by the newly-created child operation 193 of the one or more memory pages in the memory buffer that are not yet populated in memory (e.g., local or remote PMEM).

In response to the initial user-space page fault notification indicating initial access by the child operation 193, example process 1000 continues at operation 1008 with creating the clone (e.g., clone 721) in PMEM.

Distributed Memory Object Architecture

In some embodiments, one or more of the introduced techniques can be applied in a distributed system. For example, a DMO system can provide persistent DMOs that can be accessed in either in-memory or file-storage mode, and may be implemented in low-latency RDMA. Thus, the DMO system enables use of DMOs both as memory and storage. The DMO system may also enable data in the system to be converted between in-memory and file-storage modes. In general, a DMO system can provide close-to-memory-speed data access which in turn can significantly relieve data bottlenecks observed at upper layer applications. Furthermore, embodiments may be built in user-space, thus obviating the need to install a customized operating system kernel.

FIG. 11 is an illustration of an example embodiment of a DMO system 1100 that provides persistent DMOs that can be accessed in either memory mode or file-storage mode. In the example DMO system 1100, a system cluster 1105 is formed by a number of nodes. Each node in the system cluster 1105 may include a memory, a processor, and a network interface through which the node may send and receive messages and data. The illustrated DMO system 1100 provides for the creation of sharable memory spaces, each space being a DMO with a single owner node such as DMO owner node 1142. In this example a node that uses a DMO is referred to herein as a client proxy node 1140. In the example embodiment depicted in FIG. 11, a system cluster 1105 within which the DMO system 1100 may be implemented includes an object node group 1130, a name node group 1120, a node manager 1110, and a cluster manager 1114.

Address space for a DMO may be partitioned into equal size chunks, with each chunk being stored on one or more chunk replica nodes 1144 included in the cluster of nodes 1105. The chunks are distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 1142 is responsible for coordinating updates to the client proxy nodes 1140 as well as the chunk replica nodes 1144. The object owner node 1142 is also responsible for maintaining a configurable replication factor per DMO. The object owner node 1142 and chunk replica nodes 1144 can migrate to deal with failures, performance, or resource constraints. Client proxy nodes 1140 and chunk replica nodes 1144 cooperate with the object owner node 1142 in implementing protocols to make coherent updates and thereby provide a crash consistent view in the face of failures.

A node manager 1110 operates on each node in the DMO system 1100. Once a node manager 1110 starts on a node, it can start or stop all other services associated with a node. Some services associated with a node may be started or stopped automatically or by request. The node manager 1110 is responsible for finding or electing the cluster manager (CM) 1114 and notifying its existence and node health to the cluster manager 1114. Hence the node manager 1110 has access to performance and exception information from other components in the DMO system 1100.

The cluster manager 1114 runs on a single node in the DMO system 1100. The single node on which the cluster manager 1114 runs may be elected by a consensus algorithm of the node managers 1110. The cluster manager 1114 mediates cluster membership, node ID assignment, and the name service (NS) group 1120. The cluster manager 1114 also chooses nodes to satisfy allocation request constraints against cluster resource loading.

The DMO name service 1124 is a hash-distributed service which provides mapping of a DMO name string to its object ID and the object owner. The service is hash distributed across a set of nodes in the system cluster 1105. In the present example, the set of nodes is a name service group that is determined by the cluster manager 1114.

The DMO owner 1142 is a single-node service that manages a DMO. The node corresponding to the client proxy 1140 that creates the DMO becomes the DMO owner 1142. The DMO owner 1142 is responsible for selecting (via a cluster manager 1114) an initial object node group 1130 to contain the DMO and for assigning the chunk replicas 1144 within that node group 1130. Some embodiments may contain additional object node groups 1132, 1134, etc. The DMO owner 1142 also manages growing, shrinking, migrating, and recovering both the object node group 1130 as a whole, and the chunk replica 1144 assignments within that group, as required to meet the DMO's size and replication requirement, or to optimize its usage efficiency. The DMO owner 1142 can choose to move to another node (e.g., to be on the same node as a write client proxy). If the DMO owner 1142 node fails, the DMO's node group will re-elect a new DMO owner. The DMO owner 1142 keeps track of client proxies and orchestrates all updates affecting the DMO (e.g., configuration changes as well as data writes (msync commits and/or write 10)).

The chunk replica 1144 is a slave entity to the object owner 1142 and client proxy 1140. The DMO owner 1142 and client proxy 1140 read from and write to the chunk replica 1144. The chunk replica 1144 owns some amount of storage devices (PMEM, SSD, etc.) on its node and manages the details of how/where a chunk of address space is stored therein.

The client proxy 1140 performs all input/output operations for the client and locally materializes and synchronizes/persists any object that the client requests to be memory mapped. To do that materialization, the client proxy 1140 creates a local cache for pieces of remote chunks that are in use and manages selection and eviction of pieces that are unused (or less actively used) as capacity constraints require. In some embodiments, the client proxy 1140 has code to specifically handle page fault notifications received, for example, from the userfaultfd mechanism of Linux. The client proxy 1140 may similarly be configured to handle other types of page fault notifications in other operating environments.

Figure 12:
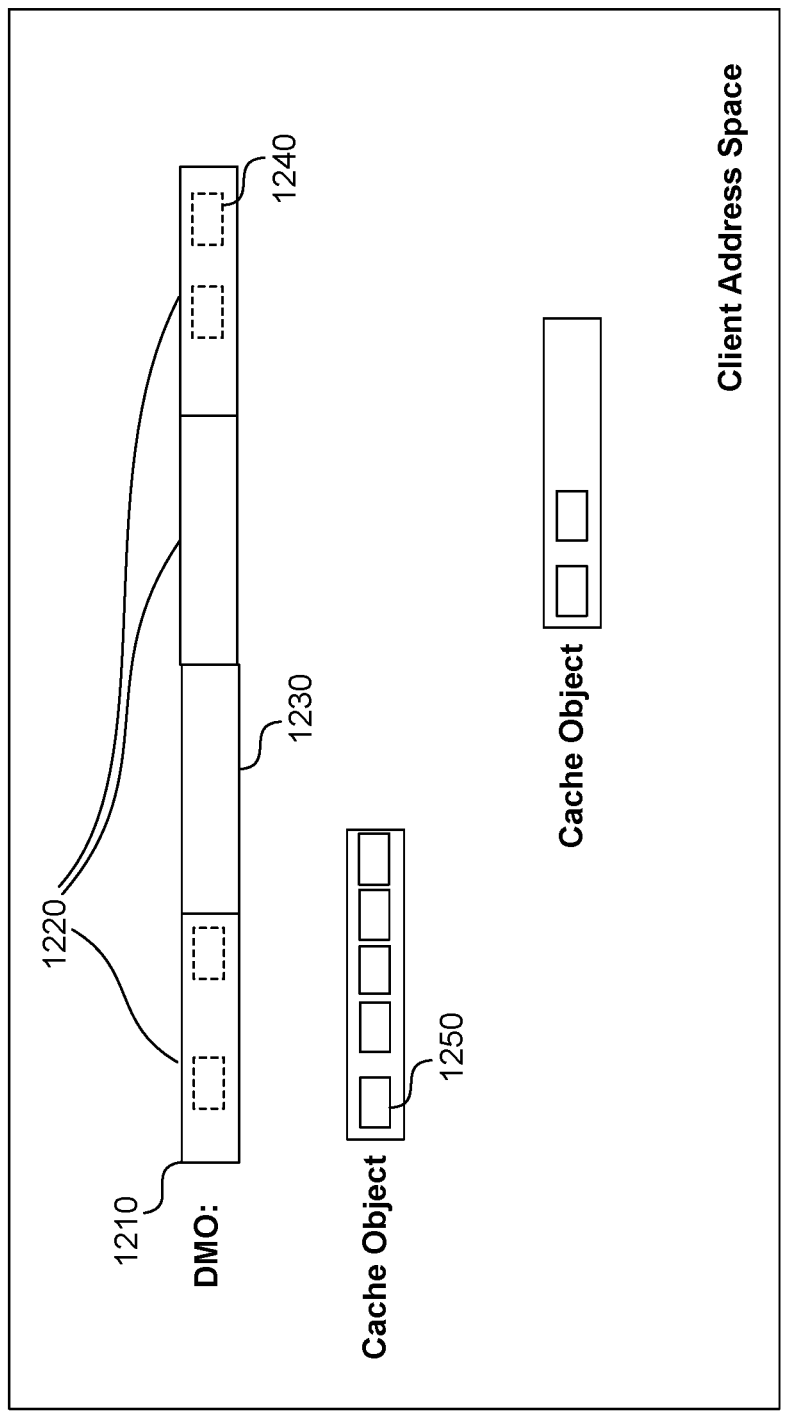
FIG. 12 shows a diagram illustrating an example DMO in a client address space.

FIG. 12 is an illustration of a DMO in a client address space. When a client proxy 1140 opens a DMO, the client proxy 1140 allocates a logical address region 1210 or space for that DMO and registers the region to monitor for page faults. The client proxy 1140 then direct maps for any local chunks 1230 at their appropriate offset within the logical address region. Next, the client proxy 1140 acquires an RDMA access descriptor to an instance of each remote chunk. The client proxy 1140 then creates and maps one or more persistent memory files to use as a cache 1250. Now when the application accesses a region of that DMO space that is not direct mapped, a page fault is signaled and the client proxy's page fault handler will allocate an area of the cache file, fill the cache file via an RDMA read of the appropriate remote chunk area 1220, and then map that area of the cache file into its appropriate offset of the DMO region, thus completing the handling of the page fault.

In some embodiments, management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 12 and additional reference to FIG. 11, a client application installed in a client node or local node, which may be any node in the system cluster of FIG. 11, opens a DMO name. For example, an application may transmit, generate, communicate, or otherwise invoke a memory call to a memory function library or other API associated with DMO system 1100 (herein referred to as a "DMO API" for illustrative simplicity) which may in turn call a client proxy 1140. As previously discussed, in some embodiments, the call by the application may be a captured call to a memory function such as malloc ( ). For example, with reference to FIG. 2, the other API 212 may represent a DMO API through which chunks of PMEM from a DMO may be allocated. In this example, the local and/or remote PMEM 218*b* of FIG. 2 would be part of a DMO. Again, with reference to FIGS. 12 and 11, the DMO API is configured to map an anonymous memory region equal to the size of the DMO, to register that memory region for user page faults, to over map 1240 the local chunk files on that memory region, and to remember the cache file for later use. The client proxy 1140 is configured to call the DMO name service 1124 to get the DMO owner 1142, call the DMO owner 1142 to get table of chunk nodes, to open "local chunk" files that are on the local node, to open an empty "cache file" or "cache object" on the local node, and to reply to the DMO API in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO. In other words, the client application can perform load/store references to the DMO, and/or read/write input/output calls to/from the DMO. If a load/store reference from the client application accesses a DMO region that is not over mapped, the client application may take or otherwise receive a page fault. The DMO API may receive a page fault notification and calls to the client proxy 1140. The client proxy 1140 caches the needed region into the cache file and replies to the DMO API. The DMO API then can over map the new region onto an appropriate local DMO space.

Thus, from a client application perspective, the DMO system 1100 enables a user, via the client application in conjunction with a client proxy, to initiate the use of a DMO, have data placed in one or more memory regions mapped to the DMO by either of a store call or a write call, and access data stored in one or more memory regions mapped to the DMO by a load call or a read call.

A DMO can be accessed in one of the two modes, namely, storage mode and memory mode. In general, storage mode allows a user to perform conventional file and object operations on DMOs. Such operations include open, read, write, close, memory map operations, and directory operations, etc. A DMO in storage mode can be replicated for high availability. Memory mode allows a user to access data using memory semantics such as memory allocation, deallocation, and accessing data using pointer semantics. Therefore, reading from and writing to memory mode objects are achieved via memory load and store semantics. Captured memory calls from an application may be handled using a DMO in memory mode.

Figure 13:
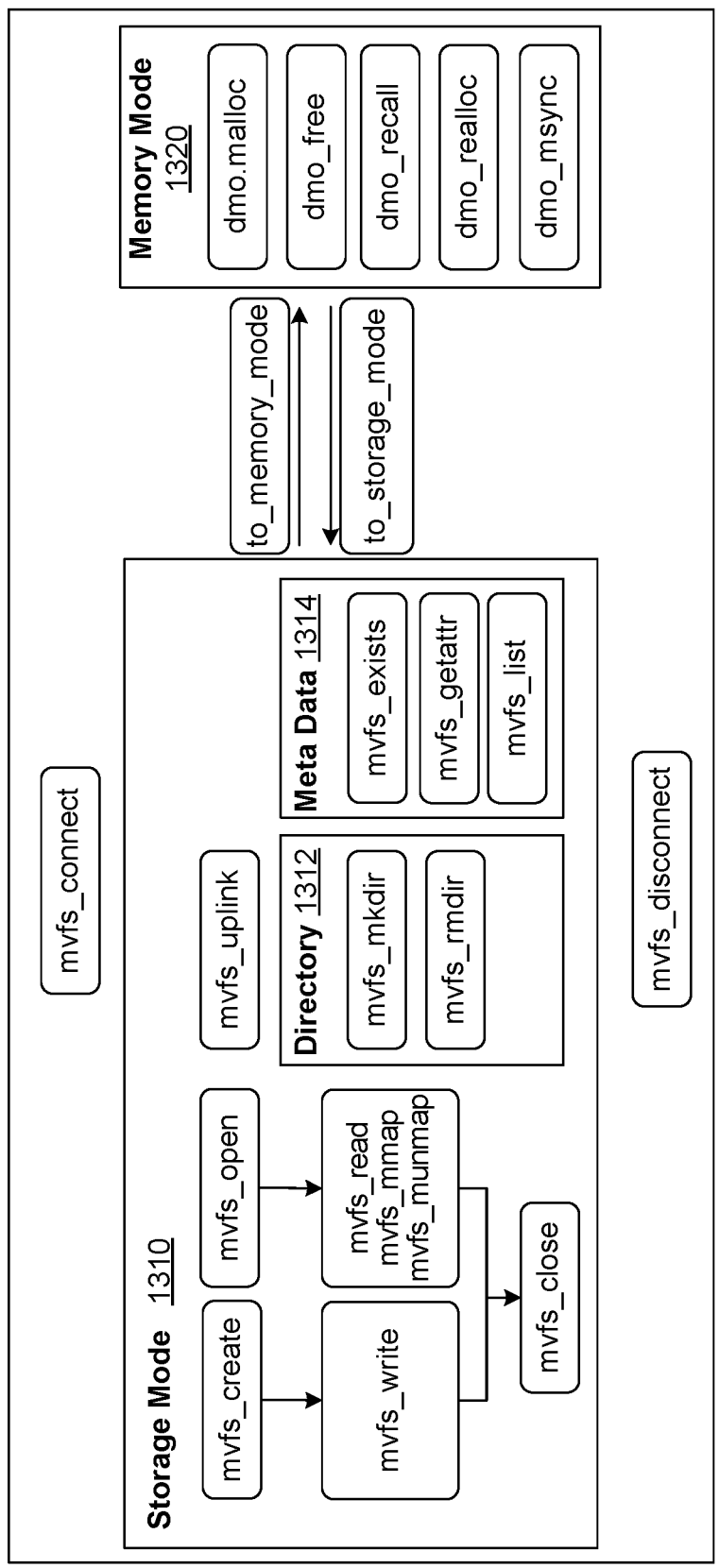
FIG. 13 shows a diagram illustrating various application programming interfaces (APIs) that may be associated the example DMO system of FIG. 11.

FIG. 13 is a block diagram that illustrates various APIs that may be associated with the various data access modes of an example DMO system 1100, namely a DMO storage mode 1310 and DMO memory mode 1320.

Storage mode 1310 is designed for "write-once, read many times" objects. The core storage mode APIs are shown in the left side of FIG. 13. A storage mode DMO can be created using the function mvfs_create( ). An application can then write data to the storage mode DMO using mvfs_write ( ), and close the storage mode DMO using mvfs_close( ). After a storage mode DMO is closed, the storage mode DMO cannot be rewritten. To read data from a storage mode DMO, an application may first open the storage mode DMO using mvfs_open( ), then read data from the storage mode DMO using mvfs_read( ). A storage mode DMO can be removed with mvfs_un/ink( ). An application can also map a storage mode DMO into its virtual memory address using the function mvfs_mmap( ), and read data through a memory copy. Note, since storage mode DMOs are write-once, the resulting mapped addresses are read-only. A storage mode DMO can be replicated to different cluster nodes to increase availability. For example, this can be performed by passing a replication policy for the storage mode DMO when the function mvfs_create( ) is called by an application. Additionally, storage mode APIs further allow users to create objects under directories.

Various example APIs associated with a DMO memory mode 620 are shown on the right side of FIG. 13. These APIs allow for the creation and destruction of memory mode DMOs via memory allocation and deallocation operations, respectively. In an example embodiment, read and write operations are performed through memory copy realized by CPU load and store instructions.

A new memory mode DMO may be created by allocating it with the function dmo_malloc( ). As alluded to previously, in some embodiments, a DMO may be created and allocated in response to capturing a call by an application to a memory function 112 such as malloc( ). With reference to FIG. 2, an intercepted call to malloc( ) may be captured by memory allocation capture library 220 and translated into a call to dmo_malloc( ) to create a memory mode DMO and/or allocate a chunk of PMEM associated with an existing memory mode DMO. In other words, the dmo_malloc( ) function associated with the DMO API may be similar to the malloc( ) function, but may instead cause memory allocation in a DMO system instead of DRAM. Instead of returning a pointer to a first byte in an allocated chunk of DRAM, the dmo_malloc( ) function may return a pointer to the first byte of a newly allocated memory mode DMO, upon a successful operation. The application can then start writing and reading data by performing memory copy operations to and from the memory address range of the allocated memory mode DMO.

An allocated memory mode DMO can be destroyed with the function dmo_free( ). The allocated memory space will then be reclaimed by DMO system 1100. The function dmo_msync( ) may be called after writing data via memory copy to make sure data are fully written into PMEM (as data may also partially stay in CPU cache).

A DMO system 1100 may support both volatile memory mode DMOs as well as persistent memory mode DMOs. Although DMOs are persistent by nature, there may be situations when persistence is not necessary, and the memory is instead used in a volatile mode. This may occur, for example, when a memory mode DMO is needed to provide additional byte-addressable memory to an application that has exceeded available DRAM. Note, the term "volatile memory mode" is not to be confused with "volatile memory" (e.g., DRAM, SDRAM, and SRAM) which is volatile by nature of the hardware. A volatile memory mode DMO may be implemented using non-volatile memory hardware such as PMEM. One way to implement these two kinds of memory mode DMOs is to include an additional input parameter for the dmo_malloc( ) function. The parameter can be a string, representing the name of the memory mode DMO to be allocated. When the input name is empty, the DMO system 1100 generates an internal unique name and allocates a volatile memory mode DMO. In turn, a volatile memory mode DMO is destroyed when a user deallocates the object or disconnects from a DMO system 1100. A volatile memory mode DMO will also be destroyed after DMO itself reboots. When input name passed to dmo_malloc( ) is non-empty, a persistent memory mode DMO will be allocated. Since a volatile memory mode DMO does not have a user-given name and therefore cannot be described, other processes cannot access it.

As opposed to a volatile memory mode DMO, a persistent memory mode DMO survives across user disconnection and/or reboot of the DMO system 1100. As long as the object is not deallocated, a persistent memory mode DMO can be retrieved using a dmo_recall function by passing in the name of the object. The function dmo_recall then looks up the object in DMO system 1100. Upon success, it returns the pointer to the first byte of the allocated persistent memory mode DMO. A user can then use the returned pointer to continue data access. As a persistent memory mode DMO has a user-given name, the object can be accessed from all the DMO nodes.

In some embodiments, all captured memory calls from an application may be handled using volatile memory mode DMOs. Alternatively, in some embodiments, certain captured memory calls may be handled using volatile memory mode DMOs while others are handled using persistent memory model DMOs. This selective allocation of volatile and persistent memory mode DMOs can be configured using the allocation policy associated with the memory allocation capture library. For example, the allocation policy may specify that a first type of memory call is handled using a volatile memory mode DMO while a second type of memory call is handled using a persistent memory mode DMO.

Memory mode APIs provide a user data access experience that is close to conventional local memory access (i.e., data locality, low latency, pointer semantics). Therefore, a memory mode DMO object can always be rewritten. However, storage features such as replication and directory support may not be available for such objects for performance and usability considerations.

In some embodiments, the DMO system 1100 may enable DMOs to be converted between different modes. For example, a persistent memory mode DMO can be converted to a storage mode DMO using the to_storage_mode API. A user can further pass in a parameter that specifies the replication policy. In this case, the DMO system 400 will switch the DMO from memory mode to storage mode, and start replicating the DMO across nodes following the specified replication policy. After conversion, the DMO may only be accessed using one or more of the storage mode APIs. Similarly, a storage mode DMO can be converted to a memory mode DMO using the to_memory_mode API. In doing so, all the replicas of the DMO will be invalidated, becoming point-in-time snapshots. Upon success, the function returns a pointer pointing to the first byte of the converted memory mode DMO. After the conversion, the memory mode DMO becomes writeable and only memory mode APIs can be used for accessing the DMO's data. Replication support may no longer be available to the DMO.

Computer Processing System

Figure 14:
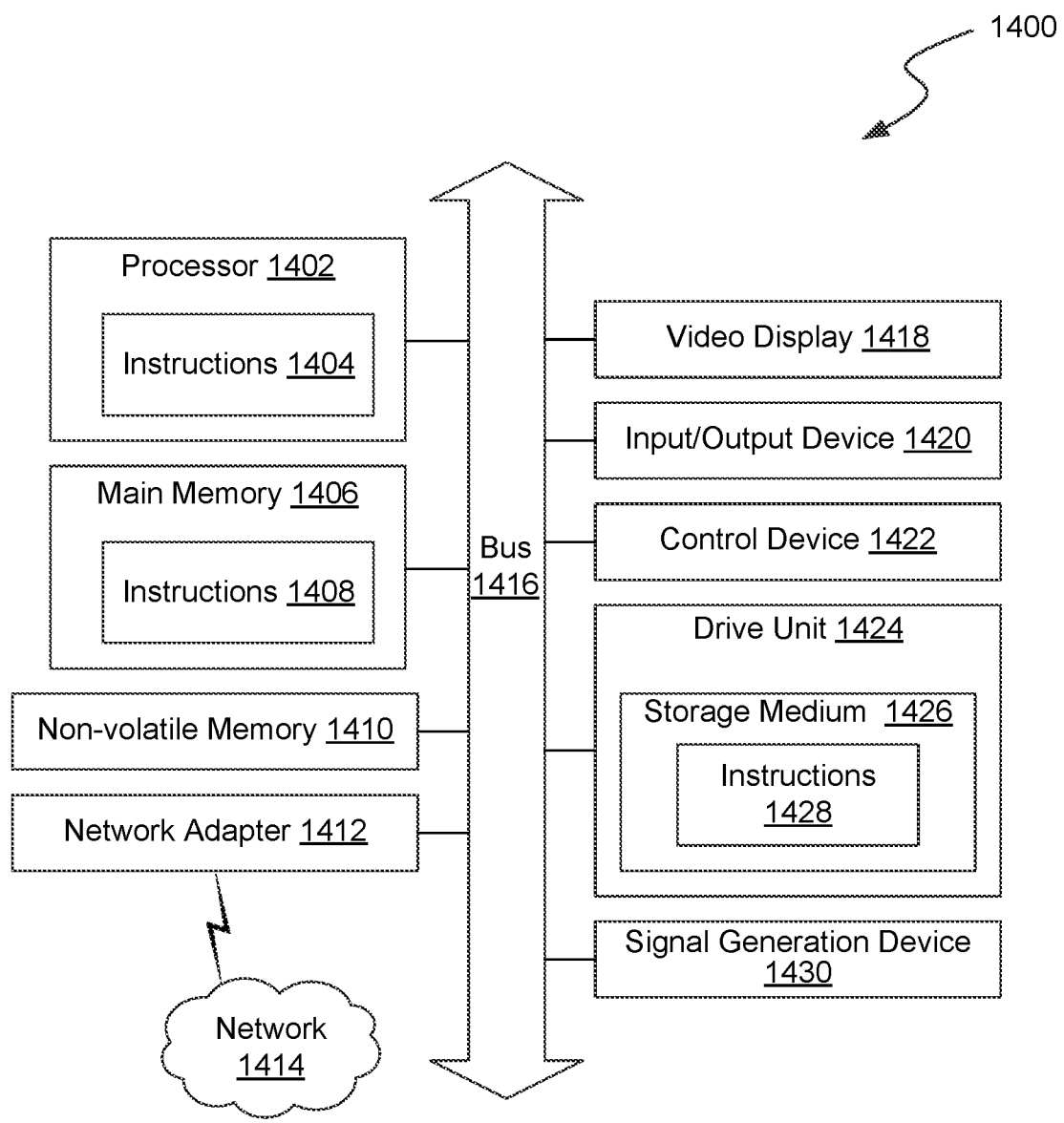
FIG. 14 shows a block diagram illustrating an example of a processing system in which at least some operations described herein can be implemented.

FIG. 14 is a block diagram illustrating an example of a computer processing system 1400 in which at least some operations described herein can be implemented. For example, some components of the computer processing system 1400 may be part of a computer system executing an application (e.g., application 110) and/or any one or more of the nodes associated with a distributed computing cluster such as DMO system 1100 described with respect to FIG. 11.

The processing system 1400 may include one or more central processing units ("processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers.

The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1400 may share a similar computer processor architecture as that of a server computer, a desktop computer, a tablet computer, personal digital assistant (PDA), mobile phone, a wearable electronic device (e.g., a watch or fitness tracker), network-connected ("smart") device (e.g., a television or home assistant device), virtual/augmented reality systems (e.g., a head-mounted display), or any other electronic device capable of executing a set of instructions (sequential or otherwise) that specify action(s) to be taken by the processing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the processing system 1400.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 802, the instruction(s) cause the processing system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1412 enables the processing system 1400 to mediate data in a network 1414 with an entity that is external to the processing system 1400 through any communication protocol supported by the processing system 1400 and the external entity. The network adapter 1412 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
    intercepting, from an executing application, a call that was intended for a first memory function associated with a first application programming interface (API) of a computer system, the call configured to be processed, using the first memory function, to cause a portion of dynamic random-access memory (DRAM) to be allocated to the executing application to process a task;

identifying one or more parameters associated with the call;

determining, based on the one or more parameters of the call, whether the call satisfies a capture criterion specified by an allocation policy;

in response to determining that the call satisfies the capture criterion specified by the allocation policy, capturing the call, through use of a memory allocation capture library, to prevent the call from being processed using the first memory function; and processing the call, by the memory allocation capture library and using a second memory function instead of the first memory function, to cause a portion of byte-addressable persistent memory (PMEM) to be allocated to the executing application instead of the portion of DRAM to process the task, wherein the second memory function is associated with a second API different than the first API associated with the first memory function.

2. The method of claim 1, wherein the portion of byte-addressable PMEM is part of a distributed memory object (DMO).

3. The method of claim 1, wherein the first memory function is any of malloc( ) or mmap( ).

4. The method of claim 1, wherein the one or more parameters include any one or more of: a type of call, a size of a mapping associated with the call, a type of the application that made the call, a time when the call was intercepted, or an elapsed time since the call was intercepted.

5. The method of claim 1, wherein the second API is associated with a DMO system, and wherein processing the call using the second memory function includes:

generating, based on the one or more parameters associated with the call, a second call to the second API, the second call configured to cause a memory mode DMO to be created and allocated to the executing application to process the task wherein the portion of PMEM is part of the memory mode DMO.

6. The method of claim 1, further comprising:

intercepting, from the executing application, a second call that was intended for the first memory function, the second call configured to be processed, using the first memory function, to cause a portion of DRAM to be allocated to the executing application to process a second task;

determining a second one or more parameters associated with the second call;

determining based on the second one or more parameters of the second call, that the second call does not satisfy the capture criterion specified by the allocation policy; and ignoring the second call in response to determining that the second call does not satisfy the capture criterion specified by the allocation policy, wherein ignoring the second call causes the second call to be processed, using the first memory function, to allocate the portion of DRAM to the executing application to process the second task.

7. The method of claim 1, further comprising:

presenting a user interface including one or more configurable parameters;

receiving, via the user interface, a user selection of values for the one or more configurable parameters;

generating an updated capture criterion based on the user selection of values for the one or more configurable parameters; and configuring the allocation policy based on the updated capture criterion.

8. A method comprising:

intercepting, from an executing application, a call intended for a first memory function associated with a first application programming interface (API), the call configured to cause a portion of volatile memory to be allocated to the executing application;

determining that the call from the executing application satisfies a specified capture criterion;

in response to determining that the call satisfies the capture criterion, capturing the call, through use of a memory allocation capture library, to prevent the call from being processed using the first memory function; and processing the call, by the memory allocation capture library and using a second memory function instead of the first memory function, to cause a portion of byte-addressable persistent memory (PMEM) to be allocated to the executing application instead of the portion of volatile memory, wherein the second memory function is associated with a second API different than the first API associated with the first memory function.

9. The method of claim 8, wherein the byte-addressable PMEM is part of a distributed memory object (DMO).

10. The method of claim 8, wherein the byte-addressable PMEM is remote from a computer system where the application is executing.

11. The method of claim 8, wherein the volatile memory is dynamic random-access memory (DRAM).

12. The method of claim 8, wherein the first memory function is associated with an operating system of a computer system where the application is executing.

13. The method of claim 12, wherein the first memory function is any of malloc( ) or mmap( ).

14. The method of claim 8, wherein determining that the call satisfies the specified capture criterion includes:

identifying one or more parameters associated with the call;

comparing the one or more parameters associated with the call to the specified capture criterion; and determining, based on the comparison, that the one or more parameters associated with the call substantially match the specified capture criterion.

15. The method of claim 8, wherein the specified capture criterion is associated with a user-configurable allocation policy.

16. The method of claim 8, wherein the one or more parameters include any one or more of: a type of call, a size of a mapping associated with the call, a type of the application that made the call, a time when the call was intercepted, or an elapsed time since the call was intercepted.

17. The method of claim 1, wherein the second API is associated with a DMO system, and wherein processing the call using the second memory function includes:

determining one or more parameters associated with the call;

generating, based on the one or more parameters associated with the call, a second call to the second API, the second call configured to cause a memory mode DMO to be created and allocated to the executing application, wherein the byte-addressable PMEM is part of the memory mode DMO.

18. The method of claim 8, further comprising:
intercepting, from the executing application, a second call intended for the first memory function, the second call configured to cause a portion of the volatile memory to be allocated to the executing application;
determining that the second call from the executing application does not satisfy the specified capture criterion; and
ignoring the second call in response to determining that the intercepted second call does not satisfy the specified capture criterion, wherein ignoring the second call causes the second call to be processed, using the first memory function, to allocate the portion of volatile memory to the executing application.

19. The method of claim 8, wherein the memory allocation capture library is located in a user-space of a computer system executing the application.

20. The method of claim 8, further comprising:
presenting a user interface including one or more configurable parameters;
receiving, via the user interface, a user selection of values for the one or more configurable parameters; and
updating the capture criterion based on the user selection of values for the one or more configurable parameters.

21. A computer system comprising:
a processor; and
a computer-readable storage medium having instructions stored thereon, which when executed by the processor, cause the computer system to:
intercept, from an executing application, a call intended for a first memory function associated with a first application programming interface (API), the call configured to cause a portion of volatile memory to be allocated to the executing application;
determine that the call from the executing application satisfies a specified capture criterion;
in response to determining that the call satisfies the specified capture criterion, capture, through use of a memory allocation capture library, the call to prevent the call from being processed using the first memory function; and
process the call, by the memory allocation capture library and using a second memory function instead of the first memory function, to cause a portion of byte-addressable persistent memory (PMEM) to be allocated to the executing application instead of the portion of volatile memory, wherein the second memory function is associated with a second API different than the first API associated with the first memory function.

22. The computer system of claim 21, wherein the volatile memory is dynamic random-access memory (DRAM).

23. The computer system of claim 21, wherein the byte-addressable PMEM is remote from the computer system.

24. The computer system of claim 21, wherein the byte-addressable PMEM is part of a distributed memory object (DMO).

25. The computer system of claim 21, wherein first memory function associated with an operating system of the computer system.

26. The computer system of claim 21, wherein determining that the call satisfies the specified capture criterion includes:
identifying one or more parameters associated with the call;
comparing the one or more parameters associated with the call to the specified capture criterion; and
determining, based on the comparison, that the one or more parameters associated with the call substantially match the specified capture criterion.

27. The computer system of claim 21, wherein the second API is associated with a DMO system, and wherein processing the call includes:
determining one or more parameters associated with the call;
generating, based on the one or more parameters of the call, a second call to the second API, the second call configured to cause a memory mode DMO to be created and allocated to the executing application, wherein the portion of byte-addressable PMEM is part of the memory mode DMO.

28. The computer system of claim 21, wherein the computer-readable storage medium has further instructions stored thereon, which when executed by the processor, cause the computer system to further:
intercept, from the executing application, a second call intended for the first memory function, the second call configured to cause a portion of volatile memory to be allocated to the executing application;
determine that the second call from the executing application does not satisfy the specified capture criterion; and
ignore the second call in response to determining that the second call does not satisfy the specified capture criterion, wherein ignoring the second call causes the second call to be processed, using the first memory function, to allocate the portion of volatile memory to the executing application.

* * * * *